US011960843B2

(12) United States Patent
Lin et al.

(10) Patent No.: US 11,960,843 B2
(45) Date of Patent: Apr. 16, 2024

(54) MULTI-MODULE AND MULTI-TASK MACHINE LEARNING SYSTEM BASED ON AN ENSEMBLE OF DATASETS

(71) Applicant: Adobe Inc., San Jose, CA (US)

(72) Inventors: Zhe Lin, Fremont, CA (US); Trung Huu Bui, San Jose, CA (US); Scott Cohen, Sunnyvale, CA (US); Mingyang Ling, Sunnyvale, CA (US); Chenyun Wu, Amherst, MA (US)

(73) Assignee: Adobe Inc., San Jose, CA (US)

( * ) Notice: Subject to any disclaimer, the term of this patent is extended or adjusted under 35 U.S.C. 154(b) by 556 days.

(21) Appl. No.: 16/401,548

(22) Filed: May 2, 2019

(65) Prior Publication Data
US 2020/0349464 A1 Nov. 5, 2020

(51) Int. Cl.
*G06N 20/00* (2019.01)
*G06F 40/30* (2020.01)
*G06V 10/25* (2022.01)
*G06V 10/764* (2022.01)
*G06V 10/82* (2022.01)
G06F 18/21 (2023.01)
G06F 40/205 (2020.01)

(52) U.S. Cl.
CPC ............. *G06F 40/30* (2020.01); *G06N 20/00* (2019.01); *G06V 10/25* (2022.01); *G06V 10/764* (2022.01); *G06V 10/82* (2022.01); G06F 18/217 (2023.01); G06F 40/205 (2020.01)

(58) Field of Classification Search
None
See application file for complete search history.

(56) References Cited

U.S. PATENT DOCUMENTS

| 10,089,576 B2 * | 10/2018 | Gao ..................... G06F 16/9535 |
| 10,713,593 B2 * | 7/2020 | Chen .................... G06N 3/0454 |
| 2014/0195466 A1 * | 7/2014 | Phillipps ................ G06F 16/00 706/12 |

(Continued)

FOREIGN PATENT DOCUMENTS

WO    WO-2018126213 A1 *  7/2018  ........... G06N 3/0454

OTHER PUBLICATIONS

Li et al. Deep Attribute-preserving Metric Learning for Natural Language Object Retrieval, MM'17, Oct. 23-27, 2017, Mountain View, CA, USA, pp. 1-9 (Year: 2017).*

(Continued)

*Primary Examiner* — David R Vincent
(74) *Attorney, Agent, or Firm* — Nicholson De Vos Webster & Elliott LLP

(57) ABSTRACT

Techniques and systems are provided for training a machine learning model using different datasets to perform one or more tasks. The machine learning model can include a first sub-module configured to perform a first task and a second sub-module configured to perform a second task. The first sub-module can be selected for training using a first training dataset based on a format of the first training dataset. The first sub-module can then be trained using the first training dataset to perform the first task. The second sub-module can be selected for training using a second training dataset based on a format of the second training dataset. The second sub-module can then be trained using the second training dataset to perform the second task.

17 Claims, 17 Drawing Sheets

(56) References Cited

U.S. PATENT DOCUMENTS

| | | | |
|---|---|---|---|
| 2017/0069327 A1* | 3/2017 | Heigold | G10L 17/18 |
| 2018/0373979 A1* | 12/2018 | Wang | G06F 18/24143 |
| 2019/0102098 A1* | 4/2019 | Biswas | G06N 3/0445 |
| 2019/0114528 A1* | 4/2019 | Xiong | G06N 3/0454 |
| 2019/0228269 A1* | 7/2019 | Brent | G06V 10/82 |

OTHER PUBLICATIONS

Xiang et al. End-to-end visual grounding via region proposal networks and bilinear pooling, 2018, IET Computer Vision, pp. 1-8. (Year: 2018).*

Li, et. al, Deep Attribute-preserving Metric Learning for Natural Language Object Retrieval, 2017, MM'17, Oct. 23-27, 2017, Mountain View, CA, USA (Year: 2017).*

* cited by examiner

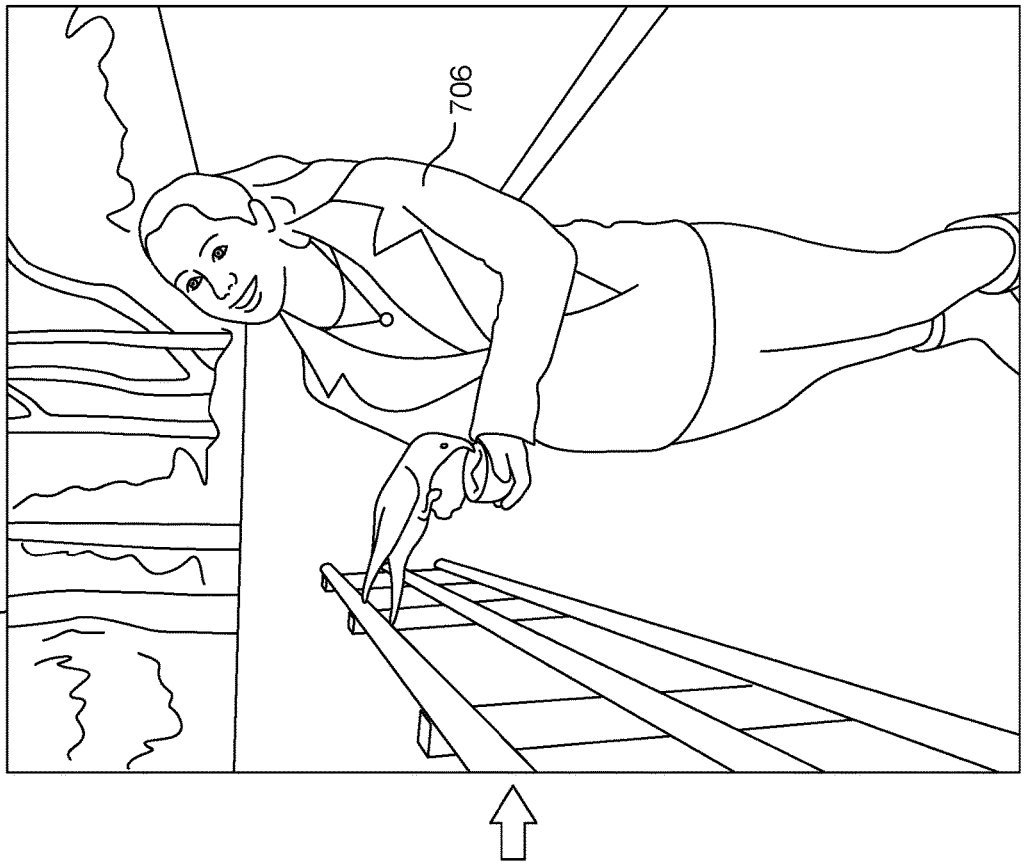
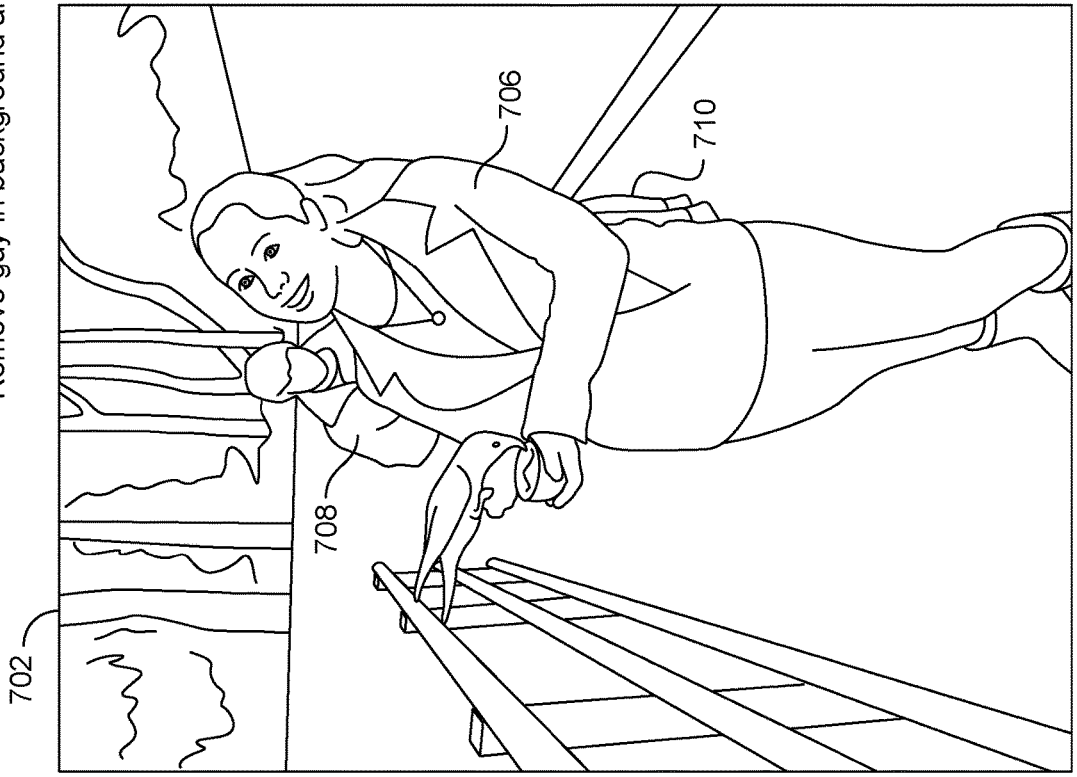
FIG. 7

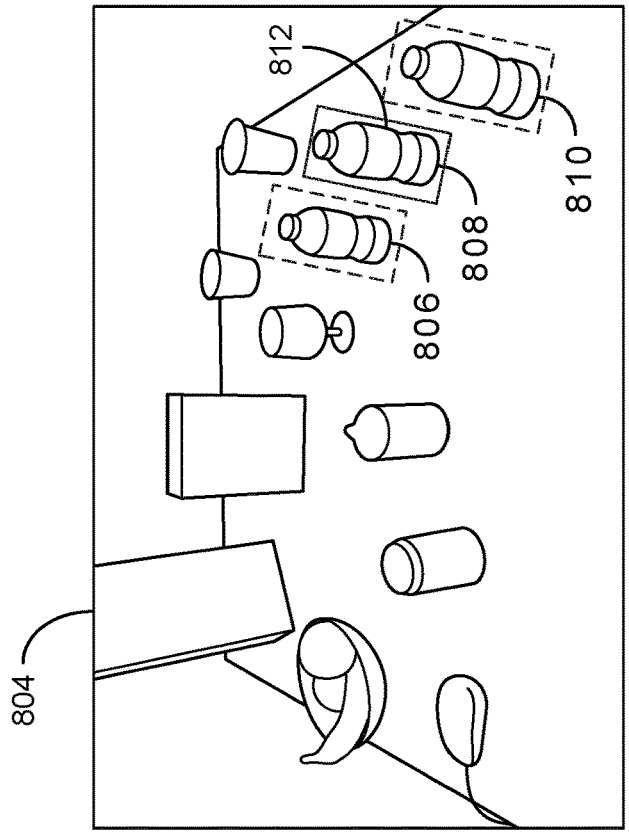
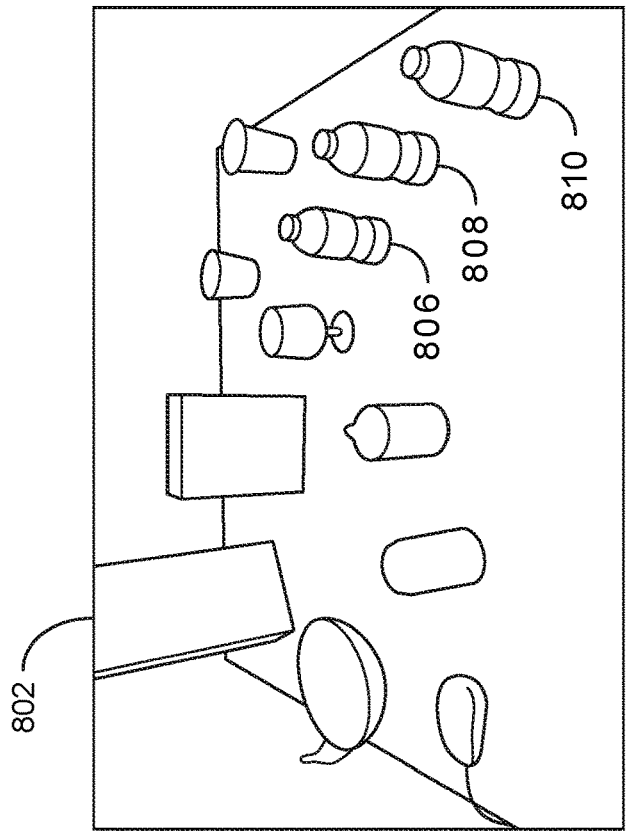
FIG. 8

1000

GENERATE A MACHINE LEARNING MODEL CONFIGURED TO PERFORM ONE OR MORE TASKS BASED ON DIFFERENT TRAINING DATASETS, WHEREIN THE MACHINE LEARNING MODEL INCLUDES A FIRST SUB-MODULE CONFIGURED TO PERFORM A FIRST TASK AND A SECOND SUB-MODULE CONFIGURED TO PERFORM A SECOND TASK
1002

↓

OBTAIN A FIRST TRAINING DATASET HAVING A FIRST FORMAT
1004

↓

OBTAIN A SECOND TRAINING DATASET HAVING A SECOND FORMAT, THE SECOND FORMAT BEING DIFFERENT THAN THE FIRST FORMAT
1006

↓

TRAIN, USING THE FIRST TRAINING DATASET, THE FIRST SUB-MODULE TO PERFORM THE FIRST TASK, WHEREIN THE FIRST SUB-MODULE IS SELECTED FOR TRAINING USING THE FIRST TRAINING DATASET BASED ON THE FIRST FORMAT
1008

↓

TRAIN, USING THE SECOND TRAINING DATASET, THE SECOND SUB-MODULE TO PERFORM THE SECOND TASK, WHEREIN THE SECOND SUB-MODULE IS SELECTED FOR TRAINING USING THE SECOND TRAINING DATASET BASED ON THE SECOND FORMAT
1010

MULTI-MODULE AND MULTI-TASK MACHINE LEARNING SYSTEM BASED ON AN ENSEMBLE OF DATASETS

FIELD

This application is generally related to machine learning and artificial intelligence. For example, aspects of this application relate to training a multi-module machine learning system with multiple datasets using multi-task learning.

BACKGROUND

Artificial intelligence has become ubiquitous in many different industries. One artificial intelligence tool, machine learning, has become customary for performing a variety of tasks. A machine learning model can perform a task by relying on patterns and inference learned from training data, without requiring explicit instructions to perform the task. An example of a machine learning model is a neural network.

Datasets play an important role in data-driven approaches. For example, a dataset can include training data used for supervised training of a neural network or other machine learning models. Typically, a single dataset is used to train a machine learning model to perform a task. For example, one dataset can be used to train a machine learning model to perform object detection, and another dataset can be used to train a different machine learning model to perform phrase parsing. Thus, there can be several datasets that are each individually available for training a machine learning model to perform a desired task. However, each dataset will have its own strengths and weaknesses relative to that target task. In one example, there may be an insufficient amount data available in a dataset for training the machine learning model to perform a target task.

One example of a target task is a referring expressions task. A goal of a referring expressions task is to identify a region described by a referring expression, which is a natural language phrase that describes a certain region in an image. Referring expressions datasets typically include images and expressions referring to objects and features of the objects in the images. However, there are limitations associated with the various referring expressions datasets. For example, the existing datasets for referring expressions do not include enough data to properly train a machine learning model to perform the referring expressions task. Further, systems trained using any one of the referring expressions datasets provide an output including only one object, as opposed to multiple objects. The ability to provide only one object as output is insufficient for referring expressions that refer to multiple objects. Other limitations of referring expressions datasets include limited object categories, poor attribute understanding, and poor relationship understanding. The limitations of referring expressions datasets make it difficult to train a machine learning model to accurately perform a referring expressions task when live input data is provided during inference (during run-time after the model has been trained).

Based on the above-described limitations of datasets for training machine learning models, there is a need for systems and techniques that combine multiple datasets to effectively train a single machine learning model to perform a given task.

SUMMARY

A multi-module and multi-task system and related techniques are described herein that leverage the strengths of multiple datasets for training a single machine learning model using multi-task learning. The multi-module and multi-task system and techniques can utilize the multiple datasets to train the machine learning model to perform one or more target tasks. Each of the different datasets can be designed for a different task. In some cases, the tasks associated with the multiple datasets can be different than the target task. For example, one dataset can include data relevant to object detection and another dataset can include data relevant to phrase parsing, while the target task of the machine learning model can be related to a referring expressions task. In some cases, a dataset from the multiple datasets can be designed for the target task of the machine learning model. As described above, any one of the datasets may not have enough data to train the machine learning model to perform the target task the machine learning model is designed to perform, and may only provide data that is relevant to a part of the target task. For example, there may not be a large enough dataset that includes the input and output (e.g., labels or other known output data) needed to train the machine learning model to perform the target task.

Using the multi-module and multi-task system and techniques described herein, the data from the multiple datasets (related to the different tasks) can be combined to provide an ensemble of training data that can be used to train certain portions of the machine learning model in a fine-tuned manner, ultimately resulting in a model that is fully trained to perform the target task. For example, the ensemble of data from the multiple datasets can be used to strategically train certain sub-modules of the machine learning model. Once the machine learning model is trained using the multiple datasets, the trained machine learning model can perform the target task (e.g., referring expressions, object detection, object classification, among others) based on any input data.

The effective use of the different datasets is enabled based on the machine learning model having a multi-module design. For example, the machine learning model can have multiple sub-modules. Each of the sub-modules can be designed for a specific task, which can be different than the target task of the machine learning model. A sub-module can be trained by a dataset having a format that is related to the task of the sub-module. The machine learning model can use the format of the dataset to select the sub-module for being trained by that dataset. The format can include a name of the dataset, a task for which the dataset is applicable (e.g., instance detection, image classification, referring expression, phrase matching, among others), content of the dataset (e.g., images, phases, labels, and/or other content), a combination thereof, and/or other suitable information. Certain layers (e.g., hidden layers) of the machine learning model can be shared across the different sub-modules (and thus can be trained using data from multiple datasets), and certain other layers can be exclusive to a particular sub-module.

In one illustrative example, the target task of the machine learning model can be a referring expressions task. As noted above, a goal of a referring expressions task is to provide an identification of a region in an image described by a referring expression, which is a natural language phrase that describes the image region. As also noted above, existing referring expressions datasets lack the data to properly train a machine learning model to perform the referring expressions task. Using the multi-module and multi-task system and techniques described herein, multiple datasets can be used to train a machine learning model to perform the referring expressions task. For example, a first dataset can be a dataset specifically designed for object detection, a second dataset can be specifically designed for object segmentation, and a third dataset can be specifically designed for language comprehension. The different datasets can strategically train different sub-modules of the machine learning model to provide a well-tuned referring expressions model.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 7 is a diagram illustrating an example of an automatic image editing function performed using a referring expressions task, in accordance with some examples provided herein;

FIG. 8 is a diagram illustrating an example of a human-robot interaction function performed using a referring expressions task, in accordance with some examples provided herein;

FIG. 10 is a flowchart illustrating an example of a process of processing sets of data using a machine learning model, in accordance with some examples provided herein;

DETAILED DESCRIPTION

Figure 1:
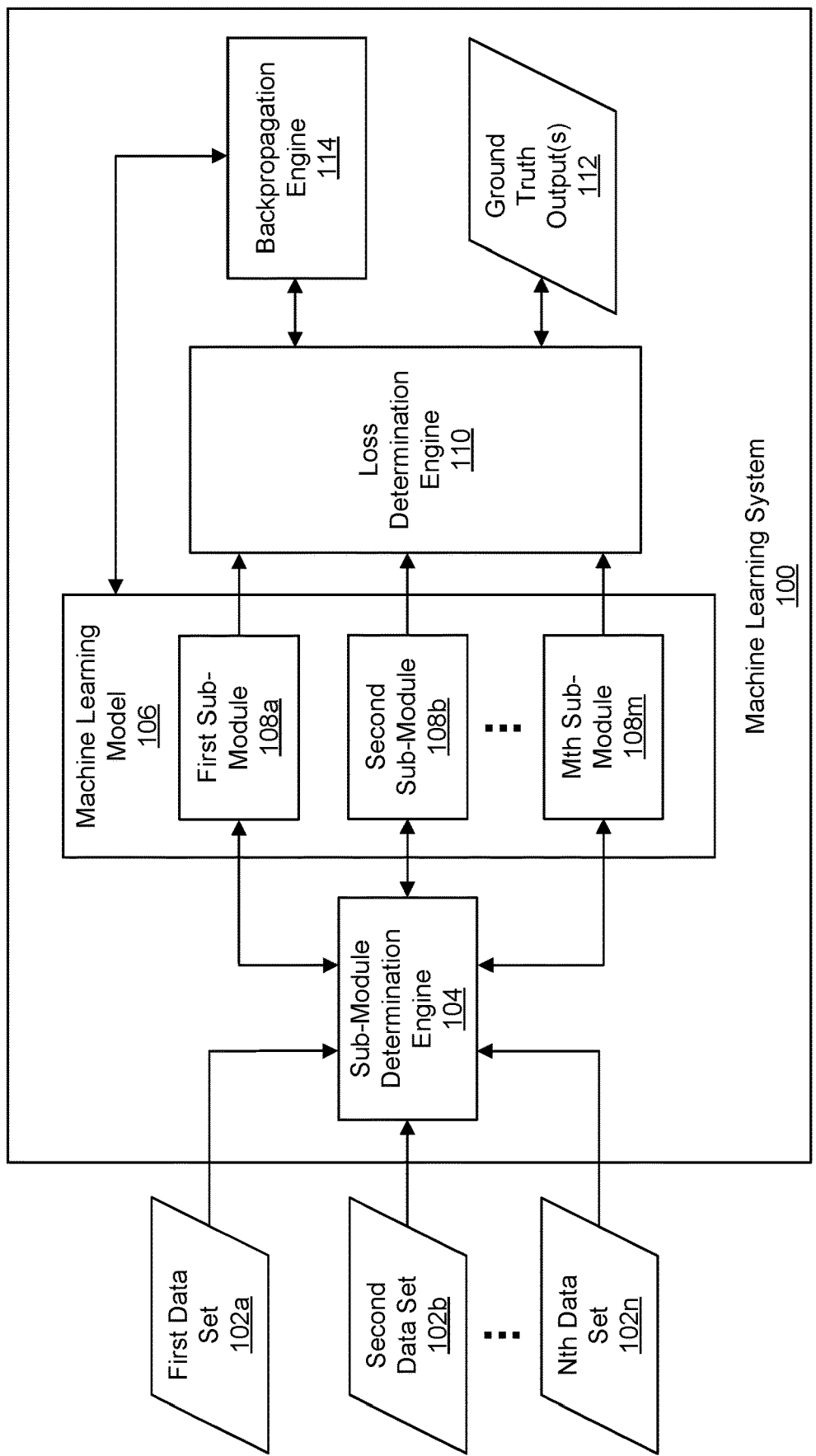
FIG. 1 is a block diagram illustrating an example of a machine learning system with components used for training a machine learning model, in accordance with some examples provided herein.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Artificial intelligence (AI) refers generally to the ability of a machine or system to mimic intelligent human behavior. AI has existed for many decades, but has become a widespread phenomenon in recent years. Machine learning is a sub-area of AI, in which a machine learning model is trained how to learn to perform one or more specific tasks. Machine learning models have become customary in many devices and systems for performing various tasks. A machine learning model is trained to perform a target task by learning patterns from a training dataset. One example of a machine learning model is a neural network, which can include an input layer, multiple hidden layers, and an output layer.

Various datasets can be used to train machine learning models to perform different tasks. A dataset is also referred to herein as a training dataset. A dataset includes training data used for supervised training of a neural network or other machine learning model. A single dataset is typically used to train a machine learning model to perform a task for which the dataset is designed. For example, one dataset can be used to train a machine learning model to perform object detection, and another dataset can be used to train a machine learning model to parse one or more phrases. There can be several datasets that are each individually available for training a machine learning model to perform a desired task, however, each dataset will have its own strengths and weaknesses relative to that target task. In some cases, there may be an insufficient amount data available for training the machine learning model to perform the target task. When a machine learning model is trained to perform a task using a dataset that lacks the amount of data needed for the task, the machine learning model will provide less than optimal results. For example, a neural network trained to perform object detection may misidentify certain objects when trained using a dataset with an insufficient amount of data.

An illustrative example of a target task that a machine learning model can perform is a referring expressions task. A goal of a machine learning model trained to perform a referring expressions task is to identify a region described by a referring expression, which is a natural language phrase that describes a certain region in an image. Existing referring expressions datasets do not include enough data to properly train a machine learning model to perform the referring expressions task. Examples of referring expressions datasets include RefCOCO, RefCOCO+, RefCOCOg, RefClef, ReferItGame, among others. The referring expressions datasets include images and expressions referring to objects and features of the objects in the images. For instance, one example from the RefCOCO dataset has a known input including an image with two women sitting beside one another on a bench, and a known output corresponding to the known input. The known output includes three referring expressions describing the woman on the right side (including "woman on right in white shirt," "woman on right," and "right woman") and a bounding box around the region of the image including the woman on the right. The known input and output can be provided to a machine learning system (e.g., a neural network or other machine learning system) in order to train the machine learning system to identify similar objects in similar images based on similar referring expressions.

However, there are limitations to the various referring expressions training datasets. For example, the output of systems trained using the referring expressions datasets provide an output including only one object, as opposed to multiple objects. Such an output is insufficient for referring expressions that refer to multiple objects, such as "identify the players in white shirts." Other limitations of such datasets include that there are limited object categories (e.g., there are only 80 RefCOCO categories), poor attribute understanding (e.g., an attribute such as "blond hair"), and poor relationship understanding (e.g., a relationship between two objects, such as an expression of "man holding plate").

The limitations of the referring expressions datasets make it difficult to train a machine learning model to accurately perform a referring expressions task when live input data is provided during inference (during run-time after the model has been trained). For example, an input provided during inference can include an image with a completely different object than that covered by the 80 RefCOCO categories, and/or with attributes and/or relationships that are not contemplated by the training dataset. Other datasets (e.g., object detection, object segmentation, vision, and language comprehension datasets, among others) are helpful, but none of them cover the full aspect of the referring expression problem. Limitations also exist in other training datasets used for other target tasks, such as visual question answering, object instance segmentation, object classification, face authentication, among others, where individual datasets for the different target tasks do not provide enough information to perform the tasks in an effective manner. As a result, training a machine learning model to perform a task using an insufficient dataset leads to a poor performing model that provides deficient results.

Multi-module and multi-task systems and techniques are described herein that leverage the strengths of multiple datasets for a single machine learning model. Various benefits are provided using the multi-module and multi-task system and techniques described herein. For example, multiple datasets in different formats are used to improve a single machine learning model. Such a solution is different than existing machine learning systems, where the input to a machine learning model is typically from a single dataset and all layers of a machine learning model are typically trained using the input data. Using the techniques described herein, a machine learning model includes multiple sub-modules that are designed to be trained by different datasets. For example, as described in more detail below, certain sub-modules may only be trained by certain input datasets. Further, some systems utilize several machine learning models trained to perform a task, and the predictions from the different models are combined together to produce a final prediction. The techniques described herein utilize an ensemble of multiple datasets to train a single model, rather than groups of models.

FIG. 1 is a block diagram illustrating an example of a machine learning system 100 including a multi-module machine learning model 106 that can be trained using multiple datasets (a first dataset 102a, a second dataset 102b, up to an Nth dataset 102n). The machine learning system 100 can be implemented by and/or included in a computing device. For example, the computing device can include a server, a personal computer, a tablet computer, a mobile device, a wearable device, and/or any other computing device with the resource capabilities to perform the techniques described herein. The machine learning system 100 includes various components, including a sub-module determination engine 104, a machine learning model 106, a loss determination engine 110, and a backpropagation engine 114. The machine learning system 100 can also include an input device and an output device (not shown). The components of the machine learning system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the machine learning system 100 is shown to include certain components, one of ordinary skill will appreciate that the machine learning system 100 can include more or fewer components than those shown in FIG. 1. For example, the machine learning system 100 may also include, in some instances, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices), one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The machine learning system 100 can receive, as input, training datasets that can be used to train the machine learning model 106 to perform one or more target tasks. As shown in FIG. 1, the input training datasets can include a first dataset 102a, a second dataset 102b, up to an Nth dataset 102n, where N is an integer greater than 1. While at least three training datasets are shown in the example of FIG. 1, only two datasets could be provided as input to the machine learning system 100. The datasets 102a, 102b, through 102n can be received from another device, obtained from storage, generated by the computing device that includes the machine learning system 100, or can be obtained in any other way. The datasets 102a, 102b, through 102n are each individually designed for a specific task, which can be different than or the same as the ultimate target task the machine learning model 106 is trained to perform. For instance, the first dataset 102a can be relevant to image classification, the second dataset 102b can be relevant to phrase parsing, and a third dataset can be a referring expressions dataset, while the ultimate target task of the machine learning model 106 can be related to a referring expressions task.

As described in more detail below, the multi-task learning is based on the data from the datasets 102a, 102b, through 102n (related to the different tasks) being combined to provide an ensemble of training data that can be used to strategically train certain sub-modules of the machine learning model 106 in a fine-tuned manner. In some cases, the machine learning model 106 can be trained to perform multiple tasks. For instance, the multi-task learning can be used to train the machine learning model 106 to perform well on multiple tasks, leading to high performance on multiple evaluation datasets during inference. In such cases, the same type of data can be used in both training and evaluation. In other cases, the machine learning model 106 can be trained to perform only one target task (e.g., referring expressions, object classification, object authentication, or other target task). In such cases, the multi-task feature is only present during the training of the machine learning model 106, and the evaluation or inference stage is based on a single dataset that is related to the target task. The machine learning model 106 is trained with the multiple datasets (which can be different from the target task dataset used at inference) to improve performance at the inference stage.

One illustrative example of a target task the machine learning model 106 can be trained to perform includes the referring expressions task. While the referring expressions task is used as an example, one of skill will appreciate that the machine learning model 106 can be trained to perform any suitable task using the techniques described herein. In one example, two specific datasets that can be used to train the machine learning model 106 to perform a referring expressions task include the Visual Genome dataset and the RefCOCO dataset. One of skill will appreciate that any other datasets, in addition to or as an alternative to the Visual Genome and/or RefCOCO datasets, can be used by the techniques described herein. As noted above, the RefCOCO dataset is a referring expressions dataset, including data such as location expressions (e.g., "car on the right," "second left person," "woman on right," among others). The RefCOCO dataset includes approximately 142,000 refer expressions for approximately 50,000 objects in approximately 20,000 images. The Visual Genome dataset includes approximately 108,000 images, 5.4 million region descriptions, 1.7 million visual questions and answers, 3.8 million object instances, 2.8 million attributes, and 2.3 million relationships, with the data being mapped to Wordnet synsets. The Visual Genome dataset has more categories, attributes, relationships, and a larger vocabulary than the RefCOCO dataset.

The RefCOCO and Visual Genome datasets perform well for different categories. For instance, the Visual Genome dataset does well at categorizing terms such as "sky," "table," "head," and "hand," but does not do well with terms such as "person," "woman," "window," and "water." On the other hand, the RefCOCO dataset performs well with terms such as "man," "woman," and "table," but does not do well with terms such as "sky," "window," "ground," and "grass." A reason for the deficiency comes from the different distribution over categories in the Visual Genome and RefCOCO datasets. For instance, Visual Genome contains many annotations for certain terms, such as "sky," "grass," etc., and for object parts, such as "head," "hand," etc. The terms covered by Visual Genome are not present in RefCOCO. In RefCOCO, people related terms (e.g., "man," "woman," etc.) and other object terms (e.g., "table," etc.) make up a larger portion of the dataset. Using the techniques described herein, the single machine learning model 106 can be trained to concurrently work on both datasets (among other datasets in some cases) during inference. A model trained to perform a referring expressions task using the techniques described herein can handle object categories that occur less frequently (e.g., that may not be identifiable when trained using prior techniques) using various expressions.

In some implementations, the machine learning model 106 can include a neural network, such as a deep neural network. While a neural network is described herein as an example, one of skill will appreciate that the machine learning model 106 can include other types of machine learning mechanisms. In general, a deep neural network includes an input layer, multiple hidden layers, and an output layer. A detailed example of a neural network 220 is described below with respect to FIG. 2.

As shown in FIG. 1, the machine learning model 106 has a modular design, which enables the effective use of the different datasets 102a, 102b, through 102n. For example, the machine learning model 106 can have multiple sub-modules, including a first sub-module 108a, a second sub-module 108b, up to an Mth sub-module 108m, where M is an integer greater than 1. While at least three sub-modules are shown in the example of FIG. 1, only two sub-modules could be included in the machine learning model 106. The number of sub-modules (M) can be the same as the number of datasets (N), or can be more or less than the number of datasets. The multi-module structure allows different datasets to be fed (e.g., concurrently) into one overall model.

As noted above, the datasets for the different tasks include different labels and present different goals for different tasks. The sub-modules 108a, 108b, through 108m can be designed to process the various types of input in the different datasets 102a, 102b, through 102n. For example, each sub-module 108a, 108b, through 108m can be designed for a specific dataset (and thus a specific task, which can be different than the target task of the machine learning model), in which case a certain input will only go through its corresponding sub-module. For instance, a particular sub-module can be trained by a particular dataset having a format that is related to the task of the sub-module. In one example, the sub-module 108a can process a first dataset (e.g., dataset 102a) having a first format related to a first task, the second sub-module 108b can process a second dataset (e.g., dataset 102b) having a second format related to a second task, and the Mth sub-module 108m can process a third dataset (e.g., dataset 102n) having a third format related to a third task.

Each dataset has its own data flow path through a particular sub-module of the machine learning model 106. However, certain nodes (e.g., hidden layers) of the machine learning model 106 may be shared across the different sub-modules, as shown below in the examples provided with respect to FIG. 5A through FIG. 5G. The shared nodes can be used to process data from multiple datasets. For instance, a particular dataset (e.g., related to a particular task) can be used to train multiple sub-modules, and a particular sub-module can be trained by multiple datasets jointly. There are also non-shared nodes that are not shared across multiple sub-modules. Training the entire model with several datasets improves the capability of the shared nodes and non-shared nodes during inference, which enhances the overall performance of the machine learning model. In some cases, certain data may be processed end-to-end by the machine learning model 106 to train all of the sub-modules 108a, 108b, through 108m.

The multi-module network is trained in a multi-task scheme using the different datasets 102a, 102b, through 102n. For example, the data from the datasets 102a, 102b, through 102n (related to the different tasks) can be combined to provide a mixture of training data that can be used to strategically train the sub-modules 108a, 108b, through 108m. Mixing of the data within each training dataset batch can make the training matches consistent and therefore can lead to a smoother learning curve for the machine learning model 106. In some cases, the percentage of data from the different datasets 102a, 102b, through 102n that is included in any given input batch can be controlled and can vary for different problems. For instance, the percentage of data from the datasets 102a, 102b, through 102n that is included in an input batch can be based on a hyper-parameter input to the machine learning model 106. The hyper-parameter can be tuned and can be varied for different problems. In one illustrative example, if the application scenario contains many objects for which a particular dataset is well suited (e.g., an object such as "sky" that Visual Genome dataset contains), a hyper-parameter can be provided that indicates a larger percentage of that dataset is to be used as the input to the machine learning model 106. In another example, if the application scenario contains more people, a hyper-parameter can be provided that indicates a dataset that is suited for identifying people (e.g., RefCOCO, which has much data related to people, such as "man", "woman," etc.) is to have a larger percentage of input data to the machine learning model 106 than other datasets.

In some implementations, the percentage of data used from the different datasets 102a, 102b, through 102n can change automatically throughout the training of the machine learning model 106. For instance, easier datasets can be weighted higher (with higher percentages) at the beginning of the training, and as training progresses, more difficult datasets can be weighted higher (with higher percentages) and the easier datasets can be weighted lower (with lower percentages). The gradual adjustment of the percentages of the data used from the different datasets can be controlled manually or can be controlled automatically by the machine learning system 100. In one illustrative example, the RefCOCO dataset can be easier for the machine learning model 106 to process than the Visual Genome dataset. In such an instance, the machine learning system 600 can start training with 100% data from RefCOCO, and can gradually add Visual Genome data to the training data up until the percentage reaches 20% RefCOCO and 80% Visual Genome, or other suitable ratio. In another illustrative example, the percentage of data used from the different datasets 102a, 102b, through 102n can be adjusted according to the loss (or based on the decrease of the loss) from the different datasets 102a, 102b, through 102n, which can lead to balanced performance over the various tasks related to the different datasets 102a, 102b, through 102n. For instance, the weights for three datasets can be W1 for dataset 1, W2 for dataset 2, and W3 for dataset 3, in which case the current percentage of dataset 2 is W2/(W1+W2+W3). The average loss from the three datasets is L1 for dataset 1, L2 for dataset 2, and L3 for dataset 3. Here, average loss can be used so the loss is not dependent on the number of samples. The overall average loss is denoted as L. The weights can be adjusted by $W'i=Wi+v*Wi*(Li/L-1)$, i=1, 2, 3. Here, v is a hyper-parameter indicating how fast the weights are changed. In some cases, L1, L2, and L3 can be changed to the decrease of loss, denoted as dL1, dL2, dL3.

As noted above, each sub-module 108a, 108b, through 108m can be designed for a specific dataset, and each input dataset 102a, 102b, through 102n can be used to train its corresponding sub-module. The sub-module determination engine 104 can determine which sub-module 108a, 108b, through 108m to use for processing a given dataset 102a, 102b, through 102n. The determination can be based on formats of the different datasets 102a, 102b, through 102n. The format of each dataset 102a, 102b, through 102n can include the name of the dataset, a task for which the dataset is applicable (e.g., instance detection, image classification, referring expression, phrase matching, among others), content of the dataset (e.g., images, phases, labels, and/or other content), a combination thereof, and/or other suitable information.

In one illustrative example, each of the sub-modules 108a, 108b, through 108m can be pre-determined to apply to a particular dataset 102a, 102b, through 102n based on the format of the datasets 102a, 102b, through 102n. For instance, a lookup table including the format data can be used by the sub-module determination engine 104 to determine which sub-module applies to which dataset. Using the lookup table, the sub-module determination engine 104 can determine that the first sub-module 108a will process data from the first dataset 102a, the second sub-module 108b will process data from the second dataset 102b, and the Mth sub-module 108m will process data from the Nth dataset 102n. In such an example, the format of each dataset 102a, 102b, through 102n can be included in the lookup table, and can include the name of the dataset, the task associated with the dataset, a combination thereof, and/or other suitable information.

In another illustrative example, the sub-module determination engine 104 can obtain the datasets 102a, 102b, through 102n, and can analyze the data (e.g., using a natural language processor or other mechanism) to determine the task associated with the dataset. For instance, by analyzing text of the dataset 102a, the sub-module determination engine 104 can determine that the data in the dataset 102a is focused more on the object only (and thus relates to an object detection task), and that the data in the dataset 102b is focused on the attribute of objects and/or the relationship between objects (and thus relates to a referring expressions task). Based on the analysis, the sub-module determination engine 104 can route the data in each of the datasets 102a, 102b, through 102n to the appropriate sub-modules 108a, 108b, through 108n.

Figure 5A:
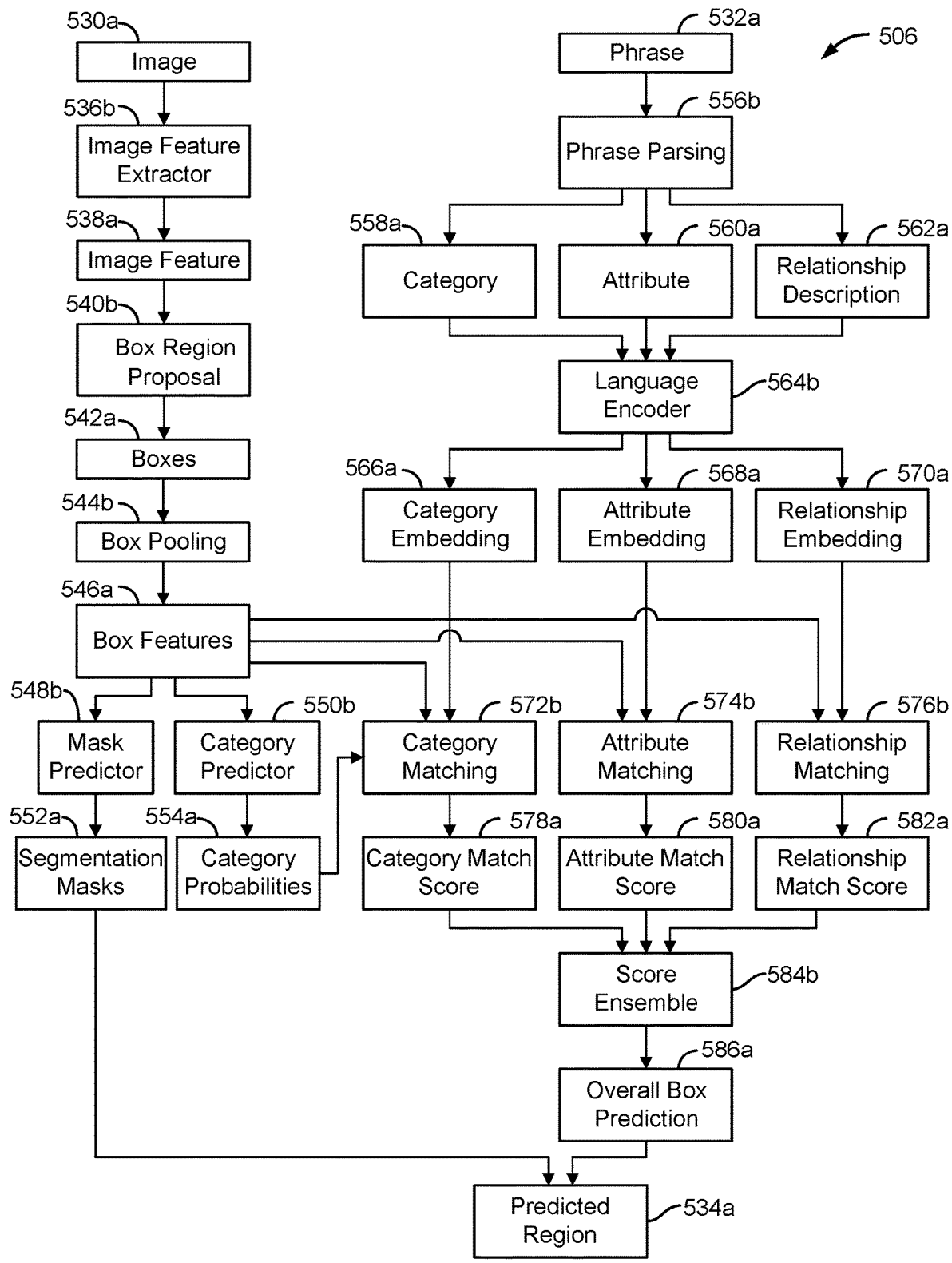
FIG. 5A is a conceptual diagram illustrating an example of a machine learning model trained to perform a referring expressions task, in accordance with some examples provided herein.

Each of the sub-modules 108a, 108b, through 108n receives the corresponding dataset 102a, 102b, through 102n as input, and processes the data using the machine learning tools (e.g., different types of hidden layers) included in the sub-modules 108a, 108b, through 108n. As described in more detail below, an example of a machine learning model 506 (during inference after being trained) is shown in FIG. 5A, with examples of sub-modules (during training) of the machine learning model 506 shown in FIG. 5B through FIG. 5G.

During training, the output from the sub-modules 108a, 108b, through 108m can be provided to the loss determination engine 110. The loss determination engine 110 can obtain ground truth outputs 112, which are compared with the actual output from the sub-modules 108a, 108b, through 108m to determine the loss associated with the actual outputs. Different loss functions can also be used for the different sub-modules 108a, 108b, through 108m, so that each sub-module 108a, 108b through 108m is individually tuned based on its output and the ground truth output associated with the dataset 102a, 102b, through 102n processed by each sub-module 108a, 108b through 108m. A ground truth output is the actual (or ground truth) output result associated with a given input. The ground truth outputs 112 include different ground truth output results for the different inputs of the datasets 102a, 102b, through 102n. In one illustrative example, for a referring expressions dataset (e.g., RefCOCO), input data can include an image and one or more expressions referring to objects and/or features of the objects in the image, and a ground truth output can include an indication of the object in the image that is associated with the one or more expressions. Using the example from above, the input can include an image with two women sitting on a bench and three referring expressions describing the woman on the right side of the bench (including "woman on right in white shirt," "woman on right," and "right woman"), and the ground truth output can include a bounding box (referred to as a label) around the region of the image including the woman on the right.

The loss determined by the loss determination engine 110 can be based on any suitable loss function, such as a using mean squared error (MSE) function, a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, any suitable combination thereof, and/or other loss function. For instance, using MSE as an example, the loss determination engine can determine the sum of one-half times the actual answer (the ground truth output) minus the answer provided by a sub-module, squared. Using the loss function, the loss determination engine 110 compares the output generated by the sub-module 108a (or other sub-module 108b through 108m) with a corresponding ground truth output associated with the training input of the dataset processed by the sub-module 108a (e.g., dataset 102a, 102b, or 102n). The loss determination engine 110 determines an error or measure of loss associated with the sub-module 108a.

Using the determined loss, the backpropagation engine 114 can determine whether parameters (e.g., weights, biases, etc.) of the first sub-module 108a, the second sub-module 108b, through the Mth sub-module 108m need to be adjusted in order to improve the accuracy by reducing the error to be within a certain threshold error or to be within a threshold similarity to the corresponding ground truth output. The first sub-module 108a will be used as an example, but the same principles apply to the other sub-modules 108b through 108m. For instance, based on the determined loss associated with the first sub-module 108a, the backpropagation engine 114 can perform one or more modifications to reduce or minimize the loss. For example, the backpropagation engine 114 can adjust the internal machine learning parameters (e.g., by modifying the weights and/or other parameters associated with various neurons or layers) of the first sub-module 108a, which will effectively change the output generated by the first sub-module 108a when another input is received, and thus will reduce the overall loss.

Once the parameters (e.g., the weights and/or other parameters of the hidden layers) are adjusted based on the loss, another set of input data and a corresponding ground truth output can be input into the first sub-module 108a. The first sub-module 108a will then generate another output based on the new set of input data, and the loss determination engine 110 will determine the loss associated with the new output. The loss associated with the new output will again be used to determine how much the first sub-module 108a needs to be adjusted to further increase its output accuracy. For example, the backpropagation engine 114 can further modify the parameters (e.g., weights and/or other parameters) of the first sub-module 408a to further reduce the error associated with the first sub-module 408a. The loss determination and backpropagation process can be repeated for several iterations (also referred to as epochs) to improve the accuracy of the first sub-module 408a until a predicted output is generated that is below the threshold error or within the threshold similarity of the ground truth output.

Figure 2:
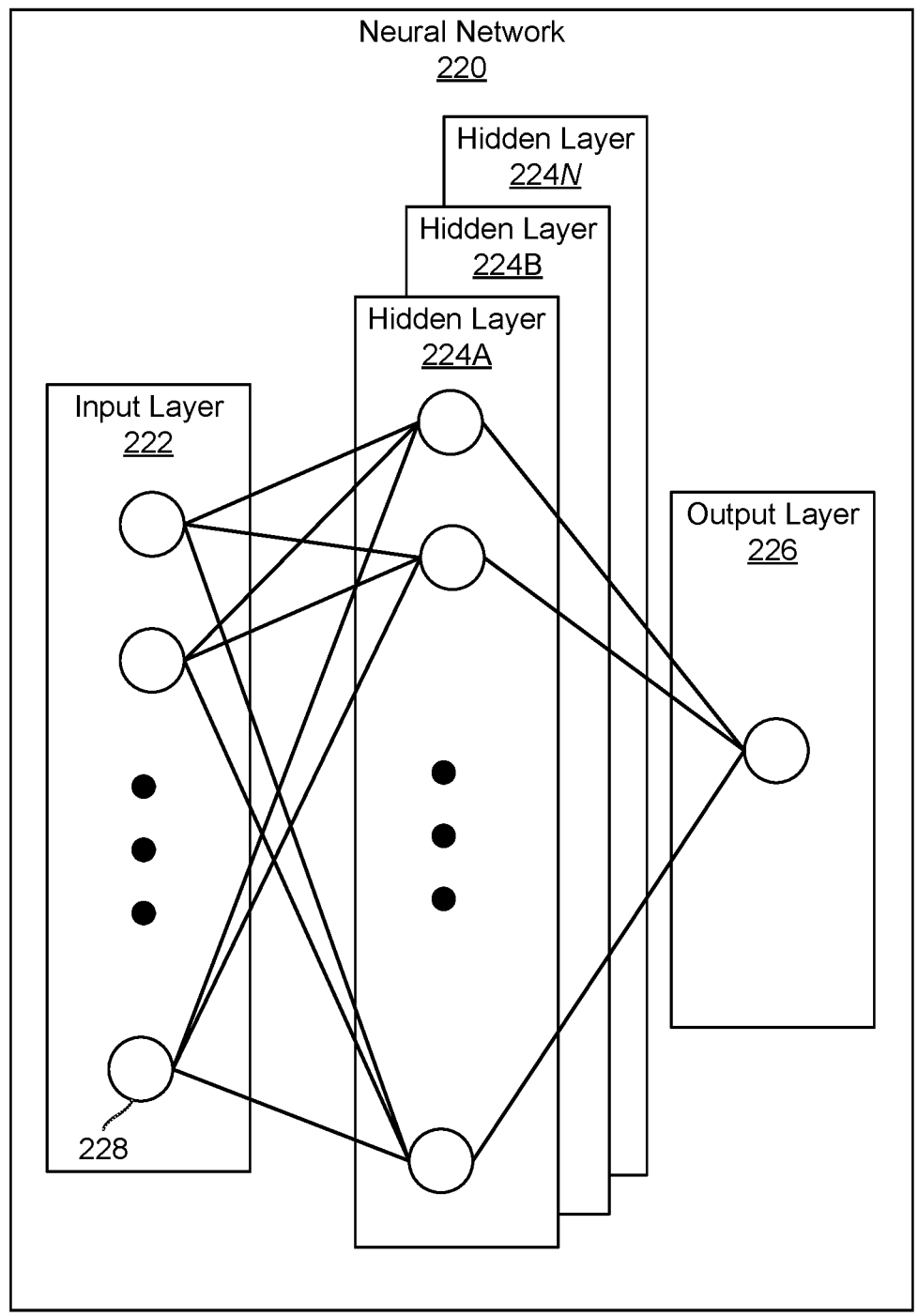
FIG. 2 is a diagram illustrating an example of a neural network, in accordance with some examples provided herein.

As noted above, the machine learning model 106 can include a neural network in some implementations. FIG. 2 is a diagram providing an illustrative example of a neural network 220 including an input layer 222, multiple hidden layers 224A, 224B, through 224N, and an output layer 226. The neural network 220 is a deep multi-layer neural network of interconnected nodes. Each node can represent an item of information. Information can be exchanged between the nodes through node-to-node interconnections between the various layers. For example, information associated with the nodes is shared among the different layers and each layer retains information as information is processed. In some cases, while nodes (e.g., node 228) in the neural network 220 are shown as having multiple output lines, a node has a single output and all lines shown as being output from a node represent the same output value. In some implementations, the neural network 220 can include a feed-forward network, in which case there are no feedback connections where outputs of the network are fed back into the network. In some implementations, the neural network 220 can include a recurrent neural network, which can have loops that allow information to be carried across nodes while reading input.

The input layer 222 includes input data. For example, the input layer 222 can include data from the datasets 102a, 102b, through 102n. In one illustrative example, the input layer 222 can include data representing the pixels of an input image and data representing a referring expression. The input layer 222 can include any other suitable input, depending on the target task of the neural network 220.

The hidden layers 224A, 224B, through 224N include "N" number of hidden layers, where "n" is an integer greater than or equal to one. The number of hidden layers can include as many layers as needed for the given target task. Nodes of the input layer 222 can activate a set of nodes in the first hidden layer 224A. For example, as shown, each of the input nodes of the input layer 222 is connected to each of the nodes of the first hidden layer 224A. The nodes of the hidden layers 224A through 224N can transform the information of each input node by applying activation functions to the information. The information derived from the transformation can then be passed to and can activate the nodes of the next hidden layer 224B, which can perform their own designated functions. Example functions include convolutional operations, up-sampling operations, data transformation operations, feature extraction, phrase parsing, language encoding, and/or any other suitable functions. The output of the hidden layer 224B can then activate nodes of the next hidden layer, and so on.

The output of the last hidden layer 224N can activate one or more nodes of the output layer 226. The output layer 226 provides an output resulting from the processing performed by the hidden layers 224A, 224B, through 224N. The output is related to the target task the neural network 220 is designed to perform. In one illustrative example, the output layer 226 can provide a classification and/or a localization for each object in an input image. The classification can include a class identifying the type of object. When trained to localize an object, a localization provided by the neural network 220 can include a bounding box indicating the location of an object.

In some cases, each node or interconnection between nodes can have a weight that is a set of parameters derived from the training of the neural network 220. For example, an interconnection between nodes can represent a piece of information learned about the interconnected nodes. The interconnection can have a tunable numeric weight that can be tuned or adjusted as described above (e.g., based on a training dataset), allowing the neural network 220 to be adaptive to inputs and able to learn as more and more data is processed.

The neural network 220 is trained to process the features from the data in the input layer 222 using the different hidden layers 224A, 224B, through 224N in order to provide the output through the output layer 226. In an example in which the neural network 220 is used to identify objects in images based on referring expressions, the network 220 can be trained using a training dataset that includes referring expressions, images, and labels. For instance, training referring expressions and training images can be input into the network, with each training image having a label (e.g., a bounding box, segmentation mask, text label, and/or other type of label) indicating which object a particular referring expression is identifying.

In some cases, the neural network 220 can adjust the weights of the nodes using backpropagation, similar to that described above with respect to FIG. 1. In general, backpropagation can include a forward pass, a loss function, a backward pass, and a parameter (e.g., weight, bias, or other parameter) update. The forward pass, loss function, backward pass, and parameter update is performed for one training iteration. The process can be repeated for a certain number of iterations for each training dataset until the network 220 is trained well enough so that the weights (and/or other parameters) of the layers are accurately tuned.

For the example of identifying objects in images based on referring expressions, the forward pass can include passing a training referring expression and a training image through the network 220. The weights are initially randomized before the neural network 220 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 220, the output will likely include values that do not give preference to any particular class or object due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 220 is unable to determine low level features and thus cannot make an accurate determination of what the classification of the object might be. As described above, a loss function can be used to analyze error in the output. Any suitable loss function definition can be used, such as those noted above. One example of a loss function includes a mean squared error (MSE). The MSE is defined as $E_{total}=\Sigma\frac{1}{2}$(target−output)$^2$, which calculates the sum of one-half times the actual answer minus the predicted (output) answer squared. The loss can be set to be equal to the value of $E_{total}$.

The loss (or error) will be high for the first training expressions and images since the actual values will be much different than the predicted output. The goal of training is to minimize the amount of loss so that the predicted output is the same as the training label. The neural network 220 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 220 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 220 can include any other deep network other than a CNN, such as an autoencoder, a deep belief nets (DBNs), a Recurrent Neural Networks (RNNs), among others.

Figure 3:
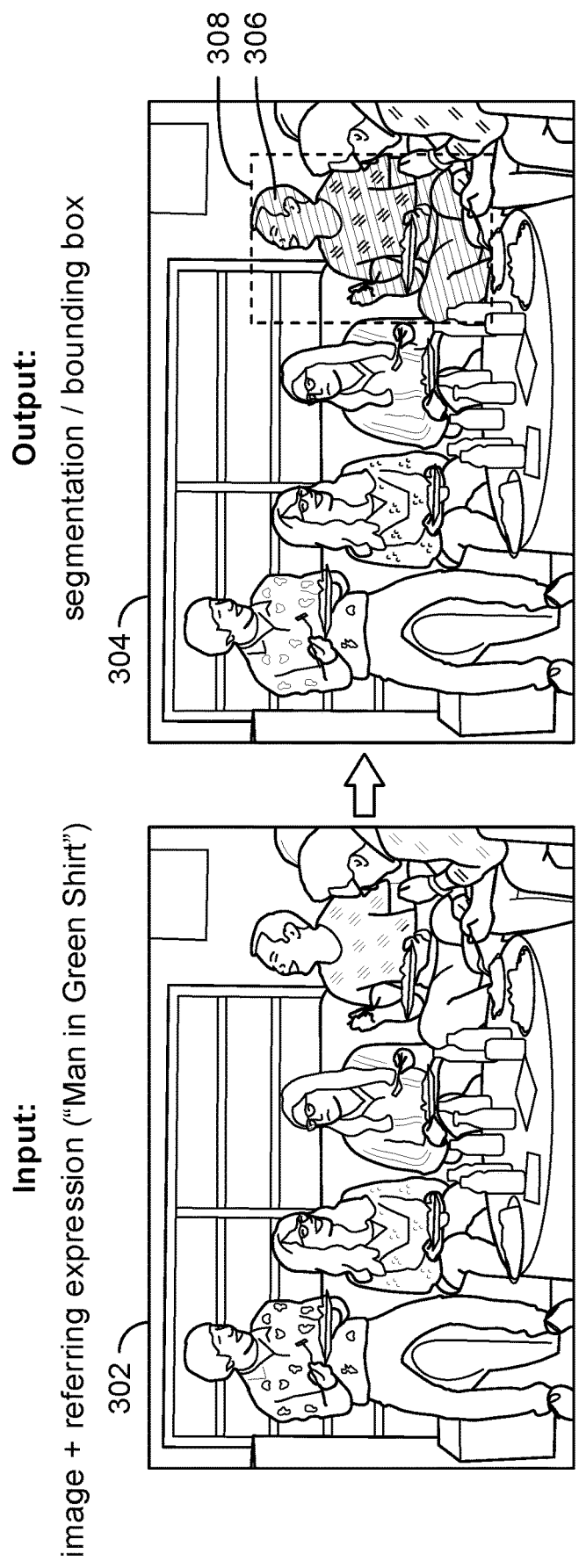
FIG. 3 is a diagram illustrating an example of a referring expressions task, in accordance with some examples provided herein.

Once the machine learning model 106 is trained, it can be used to provide an output related to a target task during inference (during run-time after the model has been trained). As noted above, an illustrative example of a target task that the machine learning model 106 can be trained to perform is a referring expressions task. FIG. 3 is a diagram illustrating an example of a referring expressions task. As noted above, a referring expression is a natural language phrase that describes a certain region in a given image. The region can correspond to an object, a feature, or other element described by the referring expression. With reference to FIG. 3, the input includes an image 302 and the referring expression "Man in Green Shirt." A goal of a referring expressions task is to provide an identification (e.g., a segmentation mask, a bounding box, or other identification) of the region described by the referring expression. The image 304 shows the output of the referring expressions task, where based on the referring expression "Man in Green Shirt," the man in the green shirt is identified by a segmentation mask 306 and a bounding box 308.

Figure 4:
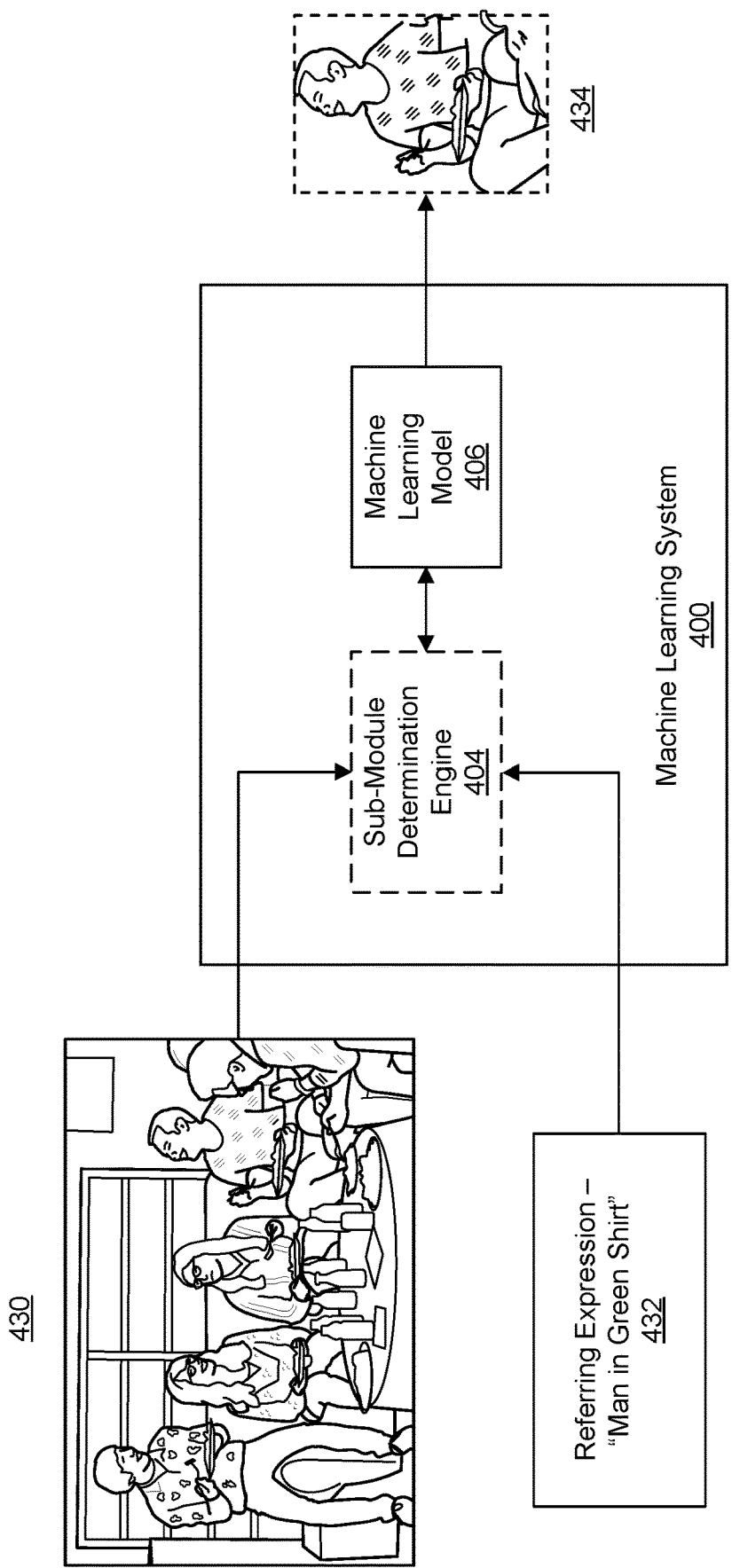
FIG. 4 is a block diagram illustrating an example of a machine learning system with a machine learning model trained to perform a referring expressions task, in accordance with some examples provided herein.

FIG. 4 is a diagram illustrating a machine learning system 400 including a trained machine learning model 406 that is trained to perform a referring expressions task. The trained machine learning model 406 can be used on-line during inference to process a referring expression input and provide an output based on the input. As shown, an input can be provided to the machine learning system 400 that includes an image 430 and a referring expression 432 of "Man in Green Shirt." For example, a user of the device on which the machine learning system 400 is installed can provide the input in order to determine the name of the man in the green shirt. The machine learning model 406 processes the input image 430 and the referring expression 432, and provides the output 434. As shown, the output 434 includes the region of the image 430 that includes the man in the green shirt.

In some cases, the machine learning system 400 can include a sub-module determination engine 404 that can determine which sub-module of the machine learning model 406 to route the input data. The sub-module determination engine 404 is optional once the machine learning model 406 has been trained. For example, in some cases, the sub-module determination engine 404 can determine which sub-modules of the machine learning model 406 will be used to process the input data based on the format of the input data, similar to that discussed above with respect to FIG. 1. In some cases, a trained machine learning system is deployed only for use by a particular task (e.g., referring expressions, object classification, object authentication, or other task), in which case the sub-module determination engine may not be needed.

The loss determination engine and the backpropagation engine (not shown in FIG. 4) are also optional components once the machine learning model 406 has been trained. For example, in some cases, once the machine learning model 406 is trained and deployed for on-line use (e.g., after being installed on a device for use by a user), no further training of the machine learning model 406 is performed. In some implementations, the machine learning model 406 can continue to be trained (referred to as on-line training) based on the input data as the machine learning system 400 is being used.

FIG. 5A is a diagram illustrating a detailed example of a machine learning model 506 that has been trained using multiple datasets to perform a referring expressions task. The architecture of the machine learning model 506 shown in FIG. 5A is an inference (or testing) architecture designed to perform a referring expressions task, similar to the machine learning model 406 shown in FIG. 4. The machine learning model 506 is a modular machine learning model with multiple sub-modules that are trained using multiple datasets. In particular, the machine learning is a neural network that includes various layers assigned to different sub-modules that are selectively trained using the different datasets. As described in more detail below, FIG. 5B through FIG. 5G are diagrams illustrating examples of different sub-modules of the machine learning model 506, and the datasets for which the sub-modules are designed. In FIG. 5A through FIG. 5G, the boxes labeled with a number ending in an "a" indicate data blocks that represent data (e.g., input or output data), while the boxes labeled with a number ending in an "b" indicate layers of the sub-modules.

As shown in FIG. 5A, the input to the machine learning model 506 includes an image 530a and a phrase 532a, and the output from the machine learning model 506 is a predicted region 534a. An example of the image 530a and the phrase 532a are the image 430 and the referring expression 432 ("Man in Green Shirt") shown in FIG. 4, and an example of the predicted region 534a is the output 434 from FIG. 4. At inference, the image 530a is input into the image feature extractor 536b. The image feature extractor 536b can include a neural network based feature extractor, such as a convolutional neural network (CNN) that is trained to extract features from images. In one illustrative example, the image feature extractor 536b is a ResNet-101 CNN. The ResNet-101 network is 101 layers deep and can classify images into 1000 object categories. In some cases, the ResNet-101 network can have an image input size requirement (e.g., an input size of 224×224 in terms of resolution, denoted as pixels x pixels), in which case the image 530a can be divided into regions having a size of 224×224. The output of the image feature extractor 536b is one or more image features 538a. For example, the image features 538a can be a feature vector representing features of the image 530a. In one illustrative example, the image features 538a can be a 7×7×2048 dimension vector per image. In some cases, the output can include an image and vector pair, which includes an identification of the image in association with the feature vector. An illustrative example of an image and vector pair is as follows (as a JSON output):

"image_path": "data://.ex/imagedata/image530a.jpg"
"feature_vector": [0.4363996684551239, 0.3034343123435974, 0.19017453491687775, 0.6557456851005554, . . .]

The image features 538a output from the image feature extractor 536b are provided to the box region proposal 540b. The box region proposal 540b can include a CNN (separate from the CNN of the image feature extractor 536b) or other suitable neural network within the larger machine learning model 506. In one illustrative example, the box region proposal 540b can include a mask R-CNN. The box region proposal 540b can detect objects in the image 530a and can identify where in the image 530a the objects are located. For instance, the box region proposal 540b can output proposed bounding boxes 542a for the objects detected in the image 530a. In one illustrative example, the bounding boxes 542a can include y boxes per image and four parameters per box, where y is an integer equal to or greater than 1 and corresponds to objects detected in the image 530a. For instance, the four parameters can include the x-coordinate of the bounding box, the y-coordinate of the bounding box, the height of the bounding box, the width of the bounding box. In another example, the four parameters can include the x-coordinate and the y-coordinate of each corner of the bounding box. Any other identifying parameters can be used to identify the location of a bounding box.

The bounding boxes 542a are output to box pooling 544b. In some cases, the box pooling 544b can be part of the neural network (e.g., CNN) used for the box region proposal 540b. In some cases, the box pooling 544b can be separate from the neural network used for the box region proposal 540b. The box pooling 544b can determine the features within each of the bounding boxes 542a using the image features 538a. For example, the image features that are within the bounding boxes 542a can be determined or extracted from the image features 538a (e.g., from an image feature vector). The output from the box pooling 544b is the box features 546a, which include the image features within each of the bounding boxes 542a. For example, the box features 546a can include a subset of the image features 538a, where the subset includes only those features of the image 530a that are included in the bounding boxes 542a. The box features 546a are output to the mask predictor 548b, to the category predictor 550b, to the category matching 572b, to the attribute matching 574b, and to the relationship matching 576b.

The mask predictor 548b can generate a segmentation mask for the input image 530a. In some cases, the mask predictor 548b can be part of the neural network (e.g., CNN) used for the box region proposal 540b (and in some cases the box pooling 544b). In some cases, the mask predictor 548b can be separate from the neural network used for the box region proposal 540b. The segmentation mask can include a mapping of each pixel in the input image 530a to a particular class. In one illustrative example, the pixels can be mapped to one of two classes, such as a person class and a non-person class, where the non-person class can be considered background. One of ordinary skill will appreciate that more than two classes can be defined. In some cases, each different classification can be represented by a pixel color (e.g., green for a person, black for the background), in which case all objects belonging to the same class will have the same color representation.

The mask predictor 548b can output segmentation masks 552a. The segmentation masks 552a can include portions of the segmentation mask that are within the bounding boxes 542a. For example, if the bounding boxes 542a include four bounding boxes, the segmentation masks 552a can include four segmentation masks (one segmentation mask for each of the four bounding boxes). In some cases, as noted above, the same neural network can be used for the box region proposal 540b and the mask predictor 548b (and in some cases the box pooling 544b). The neural network can include a CNN, such as a mask R-CNN. The CNN can detect objects in the image 530a, and can also generate a segmentation mask and bounding box proposals defining a predicted location in the image 530a for each object. For example, the CNN can predict an object segmentation mask in parallel with predicting bounding box proposals. In some cases, the effect of the box region proposal 540b and the mask predictor 548b is that bounding boxes and/or segmentation masks are only output for objects belonging to a particular class. As described further below, other layers of the machine learning model 506 are used to determine which masks and bounding boxes are provided as the predicted region 534a.

As noted above, the box features 546a are also output to the category predictor 550b. In some cases, the category predictor 550b can be part of the neural network (e.g., CNN) used for the box region proposal 540b (and in some cases the mask predictor 548b and the box pooling 544b). In some cases, the category predictor 550b can be separate from the neural network used for the box region proposal 540b. The category predictor 550b determines or predicts a probability distribution for each bounding box of the bounding boxes 542a over a certain number of categories. The probability distribution indicates a likelihood (or probability) that the bounding box contains an object having a particular category. The resulting output is the category probabilities 554a. In the category probabilities 554a, each bounding box has a predicted probability distribution over a certain number of categories (e.g., over the top 600 categories). In one illustrative example, the category probabilities 554a can include a 600-dimensional output vector representing 600 different classes of objects, such as [0 0 0.05 0.8 0 0.15 0 0 0 0 . . . 0], the vector indicates that there is a 5% probability that an object in the image is the third class of object (e.g., a dog), an 80% probability that the object in the image is the fourth class of object (e.g., a human), and a 15% probability that the object in the image is the sixth class of object (e.g., a kangaroo). The probability for a class can be considered a confidence level that the object is part of that class. The category probabilities 554a are output to the category matching 572b.

As noted above, the input to the machine learning model 506 also includes a phrase 532a. The phrase 532a is input to the phrase parsing 556b. The phrase parsing 556b parses the phrase into different phrase components, including a category 558a, an attribute 560a, and a relationship description 562a. The phrase parsing 556b can include any suitable phrase parsing mechanism, such as a recurrent neural network, a recurrent neural network over dependency trees, transition-based dependency parsing, a long short-term memory (LSTM) network, or other suitable system that can perform phrase parsing. In one illustrative example, the phrase 532a includes the phrase "smiling girls under the tree." The phrase parsing 556b can parse the example phrase into the phrase components, including a category of "girls," an attribute of "smiling," and a relationship description of "under the tree." The category 558a, the attribute 560a, and the relationship description 562a are output to the language encoder 564b.

The language encoder 564b can perform sentence classification of the phrase 532a using the category 558a, the attribute 560a, and the relationship description 562a. For example, the language encoder 564b can determine or estimate a class for the category 558a, for the attribute 560a, and for the relationship description 562a. In one illustrative example, the language encoder 564b can include a neural network, such as a bi-directional Long Short-Term Memory (LSTM) recurrent neural network (RNN) or other suitable mechanism. In some cases, the phrase parsing 556b and the language encoder 564b can be part of the same neural network. The idea of the bi-directional LSTM is that the context of the entire phrase 532a can be used to interpret what is being said. For the neural network model, embedding may be needed for the text, which can be used to represent the words as vectors. For instance, word embedding can redefine the high dimensional word features into low dimensional feature vectors by preserving contextual similarity in the phrase. A vector representation of the word that is learned can be generated by understanding the context of words. In some examples, FastText embeddings can be used, which is an open-source, lightweight library that allows systems to learn text representations and text classifiers. For instance, FastText allows a system to train supervised and unsupervised representations of words and sentences. In some examples, pre-trained embeddings (e.g., Global Vectors for Word Representation, or Glo Ve) can be used.

The language encoder 564b can output a category embedding 566a, an attribute embedding 568a, and a relationship embedding 570a. For example, the category embedding 566a can include a class for "girls," the attribute embedding 568a can include a class for "smiling," and the relationship embedding 570a can include a class for "under the tree." As noted above, an illustrative example of the language encoder 564b is a bi-directional LSTM, which can be combined with FastText or other embedding technique. In such an example, the category embedding 566a can include an LSTM output for "girls," the attribute embedding 568a can include an LSTM output for smiling," and the relationship embedding 570a can include an LSTM output for "under the tree." In some cases, the category embedding 566a, the attribute embedding 568a, and the relationship embedding 570a can be vector representations of the determined classes.

The category embedding 566a is output to the category matching 572b. As noted above, the box features 546a and the category probabilities 554a can also be output to the category matching 572b. In some cases, only the box features 546a or only the category probabilities 554a is output to the category matching 572b. The category matching 572b can match the category embedding 566a with the box features 546a to determine a category match score 578a. The category match score 578a can include a category match score generated for each bounding box in the bounding boxes 542a. For example, the category match score 578a can include a scaler for each bounding box. The category match score 578a can indicate a likelihood that a given bounding box includes one or more objects having the category determined for the phrase 532a (e.g., is a person in the bounding box a girl). In one illustrative example, the category matching 572b can determine a distance (e.g., such as an L2 distance, relating to the Euclidean distance or norm, a cosine distance, or other suitable distance) between the box features of each bounding box and the category embedding 566a. For example, the L2 distance between the feature vector of each bounding box and the vector representation of the category embedding 566a can be determined. The distance (e.g., L2 distance, cosine distance, etc.) for each bounding box can be used to determine the category match score 578a for each bounding box. For instance, using cosine distance as an example, the category match score 578a can be equal to the cosine similarity (1-cosine distance).

In another illustrative example, the category matching 572b can look up the category probability from the category probabilities 554a with the nearest category embedding in order to determine the category match score 578a. For instance, the machine learning model 506 can be trained with a limited number of categories (e.g., 600 categories). At run-time (or test time), if the category is within the number of trained categories (e.g., within the 600 trained categories), the probability on the corresponding category can be directly used. If the category is not within the number of trained categories, the word embedding (e.g., based on pre-trained word embeddings such as FastText) can be obtained for all of the trained category names (e.g., for all 600 trained categories) and the test query category of the input being processed at run-time. From the number of categories (e.g., the 600 categories), the category with the minimum distance (e.g., L2 distance, cosine distance, or other suitable distance) to the test query category can be found based on the word embeddings (e.g., the low dimensional feature vectors representing the words). The probability on the nearest category can then be used as the prediction for the category match score 578a.

The attribute embedding 568a is output to the attribute matching 574b. As noted above, the box features 546a can also be output to the category matching 572b. The attribute matching 574b can match the attribute embedding 568a with the box features 546a to determine an attribute match score 580a. The attribute match score 580a can include an attribute match score generated for each bounding box in the bounding boxes 542a (e.g., a scaler for each bounding box). The attribute match score 580a can indicate a likelihood that a given bounding box includes one or more objects having the attribute determined for the phrase 532a (e.g., is there a person in the bounding box smiling?). In one illustrative example, the attribute matching 574b can determine a distance (e.g., such as an L2 distance, a cosine distance, or other suitable distance) between the box features of each bounding box and the attribute embedding 568a. For example, the L2 distance between the feature vector of each bounding box and the vector representation of the attribute embedding 568a can be determined. The distance (e.g., L2 distance, cosine distance, etc.) can be used to determine the attribute match score 580a for each bounding box, similar to the category match score 578a described above.

The relationship embedding 570a is output to the relationship matching 576b. As noted above, the box features 546a can also be output to the category matching 572b. The relationship matching 576b can match the relationship embedding 570a with the box features 546a to determine a relationship match score 582a. The relationship match score 582a can include a relationship match score generated for each bounding box in the bounding boxes 542a (e.g., a scaler for each bounding box). The relationship match score 582a can indicate a likelihood that a given bounding box includes one or more objects having the relationship determined for the phrase 532a (e.g., is an object in the bounding box under a tree?). In one illustrative example, the relationship matching 576b can determine a distance (e.g., such as an L2 distance, a cosine distance, or other suitable distance) between the box features of each bounding box and the relationship embedding 570a. For example, the L2 distance between the feature vector of each bounding box and the vector representation of the relationship embedding 570a can be determined. The distance (e.g., L2 distance, cosine distance, etc.) can be used to determine the relationship match score 582a for each bounding box, similar to the category match score 578a described above.

The category match score 578a, the attribute match score 580a, and the relationship match score 582a are output to the score ensemble 584b. The score ensemble 584b can take the three scores for each bounding box, and can output a single match score for each bounding box. In one illustrative example, the score ensemble 584b can be multilayer perceptron (MLP). The MLP is a feedforward artificial neural network model that maps sets of input data onto a set of appropriate outputs. The MLP can receive as input the three scores 578a, 580a, and 582a for a bounding box, and outputs a single score for the bounding box.

The score ensemble 584b can choose the bounding boxes having match scores greater than a match score threshold as candidates for locating one or more objects indicated by the phrase 532a. The match score threshold can be set to any suitable value, such as 0.5, 0.6, 0.7, or other value. The match score threshold can be set manually (based on user input) or can be set automatically. For instance, the match score threshold may be set to a first value (e.g., 0.5) as a default threshold, and can be automatically adjusted to a more stringent threshold (e.g., 0.7) if more than a high threshold number of bounding boxes (e.g., more than 5 bounding boxes, or other suitable number) are determined to exceed the match score threshold. In another example, the match score threshold may be set to a second value (e.g., 0.7) as a default threshold, and can be automatically adjusted to a less stringent threshold (e.g., 0.5) if less than a low threshold number of bounding boxes (e.g., less than 2 bounding boxes, or other suitable number) are determined to exceed the match score threshold.

The score ensemble 584b can compare the single score output for a bounding box to the match score threshold to determine whether to choose that bounding box as a candidate for locating an object indicated by the phrase 532a. A similar comparison can be performed for all other bounding boxes. Based on the comparisons, the score ensemble 584b can output the overall box prediction 586a. The overall box prediction 586a can include the final box predictions from the detected bounding boxes 542a that have match scores over the match score threshold. The overall box prediction 586a can include one or more bounding boxes. In some cases, a relative match score can be used. For instance, given a query phrase (e.g., phrase 532a) and an image (e.g. image 530a), a match score can be determined for each bounding box in the image. The maximum match score among all boxes can be determined as M, and each match score of each bounding box can be divided by M. All boxes with a relative match score greater than the match score threshold (e.g., a threshold of 0.5, 0.6, 0.7, or other suitable value) can be determined as the overall box prediction 586a.

The segmentation masks 552a and the overall box prediction 586a together result in the predicted region 534a. For example, the predicted region 534a includes the part of the segmentation mask resulting from the mask predictor 548b that is included in the one or more bounding boxes that have the match scores over the match score threshold. In one illustrative example, referring to the image 430 and the referring expression 432 from FIG. 4, bounding boxes for each of the five people in the image 430 can be generated by the box region proposal 540b. However, based on the referring expression, "Man in Green Shirt," only the bounding box of the man with the green shirt on the right side of the image 430 will have a match score over the match score threshold. As a result, the predicted region 534a will include the region of the segmentation mask that is within the bounding box for the man in the green shirt.

Figure 6:
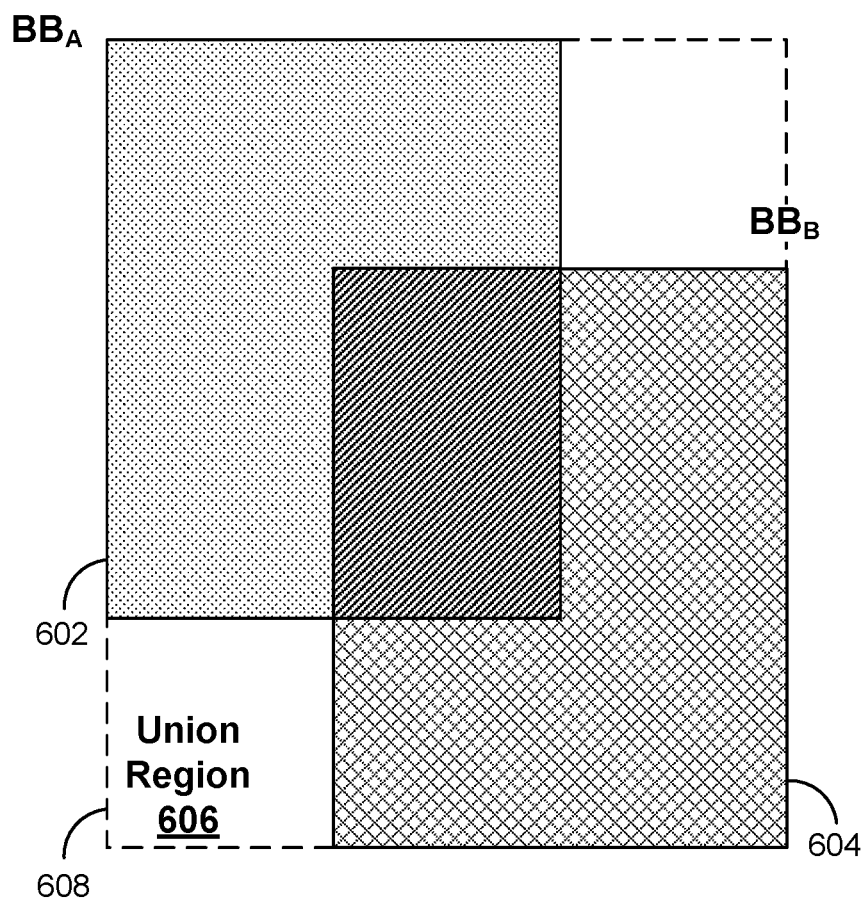
FIG. 6 is a diagram illustrating a union of two bounding boxes, in accordance with some examples provided herein.

In some cases, when multiple bounding boxes and segmentation masks are above the match score threshold, the predicted region 534a can include the union of the masks of all predicted bounding boxes that have a match score over the match score threshold. FIG. 6 is a diagram showing an example of a union U of two bounding boxes, including a bounding box $BB_A$ 602 of one object in an image and a bounding box $BB_B$ 604 of another object in the image. An intersecting region includes the overlapped region between the bounding box $BB_A$ 602 and the bounding box $BB_B$ 604. The union region 606 includes the union of the bounding box $BB_A$ 602 and the bounding box $BB_B$ 604. The union of the bounding box $BB_A$ 602 and the bounding box $BB_B$ 604 is defined to use the far corners of the two bounding boxes to create a new bounding box 608 (shown as a dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_1, BB_2) = (\min(x_1, x_2), \min(y_1, y_2), (\max(x_1 + w_1 - 1, x_2 + w_2 - 1) - \min(x_1, x_2)), (\max(y_1 + h_1 - 1, y_2 + h_2 - 1) - \min(y_1, y_2))).$$

Using the previously described techniques, the machine learning model 506 includes various sub-modules that are individually trained using different datasets. The sub-modules can be trained using supervised learning based on known ground truth outputs (also referred to as ground truth labels). FIG. 5B through FIG. 5G are diagrams illustrating examples of the sub-modules of the machine learning model 506, and the datasets for which the sub-modules are designed. As described above, a sub-module of the machine learning model 506 receives a dataset that the sub-module is designed to process, and the machine learning tools (e.g., one or more hidden layers) that are included in the sub-module are trained using the dataset. In some cases, a particular dataset can be used to train multiple sub-modules. For example, as described further below, the category, attribute, and relationship sub-module 500F and the score ensemble sub-module 500G can both be trained using the Visual Genome dataset in some implementations. In some cases, a particular sub-module can be trained by multiple datasets jointly. For example, certain layers or components that are shared among the different sub-modules can be trained by multiple datasets. In one example, as described further below, the image feature extractor 536b included in the image classification sub-module 500C, the instance detection sub-module 500D, and the referring expression sub-module 500E can be affected by different datasets.

Figure 5B:
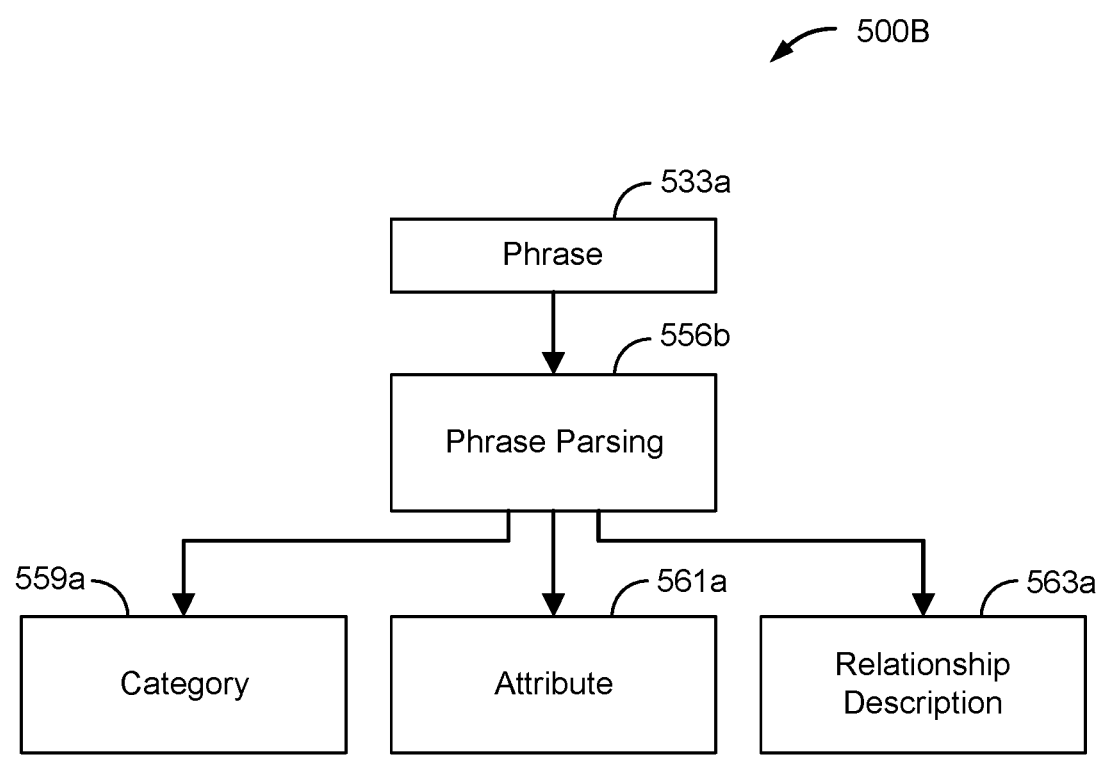
FIG. 5B through FIG. 5G are conceptual diagrams illustrating examples of sub-modules of the machine learning model from FIG. 5A, in accordance with some examples provided herein.

FIG. 5B shows a phrase parsing sub-module 500B of the machine learning model 506 (FIG. 5A). The phrase parsing sub-module 500B is trained to perform phrase parsing of input phrases (e.g., the phrase 532a) at run-time in order to parse each of the input phrases into different phrase components, including a category, an attribute, and a relationship description. The dataset used for training the phrase parsing sub-module 500B includes training phrases (including phrase 533a) and ground truth outputs. The ground truth outputs include category labels (e.g., for comparing with output category 559a output), attribute labels (e.g., for comparing with attribute 561a output), and relationship description labels (e.g., for comparing with relationship description 563a output). The dataset (including the input phrases, the category labels, the attribute labels, and the relationship description labels) can be any suitable natural language (or speech-based) dataset, such as an NLTK Treebank dataset or other suitable dataset.

As described above with respect to FIG. 1, the sub-module determination engine 104 can obtain and analyze the dataset (including the input phrases, the category labels, the attribute labels, and the relationship description labels) to determine which sub-module of the machine learning model 506 (FIG. 5A) to route the dataset. The sub-module determination engine 104 can determine the appropriate sub-module using a lookup table, by analyzing text of the dataset, or using any other suitable technique. Based on the analysis, the sub-module determination engine 104 can determine the dataset is a natural language dataset, and is to be used to train the phrase parsing sub-module 500B. The training phrases can then be input to the phrase parsing sub-module 500B. The phrase parsing sub-module 500B can process a first iteration of the training dataset using an initialized set of parameters (e.g., weights and/or biases). For example, the phrase 533a can be input to the phrase parsing sub-module 500B, which can output the category 559a, the attribute 561a, and the relationship description 563a. The loss determination engine 110 (FIG. 1) can compare the category 559a to the category label for the phrase 533a, the attribute 561a to the attribute label for the phrase 533a, and the relationship description 563a to the relationship description label for the phrase 533a, in order to determine the loss associated with the outputs. The backpropagation engine 114 (FIG. 1) can then be used to tune the parameters (e.g., weights and/or biases) of the phrase parsing sub-module 500B. The loss determination engine 110 and the backpropagation engine 114 can be used to iteratively train the phrase parsing sub-module 500B until the parameters are tuned in a way that allows the phrase parsing sub-module 500B to accurately parse different types of input phrases into the phrase components.

Figure 5C:
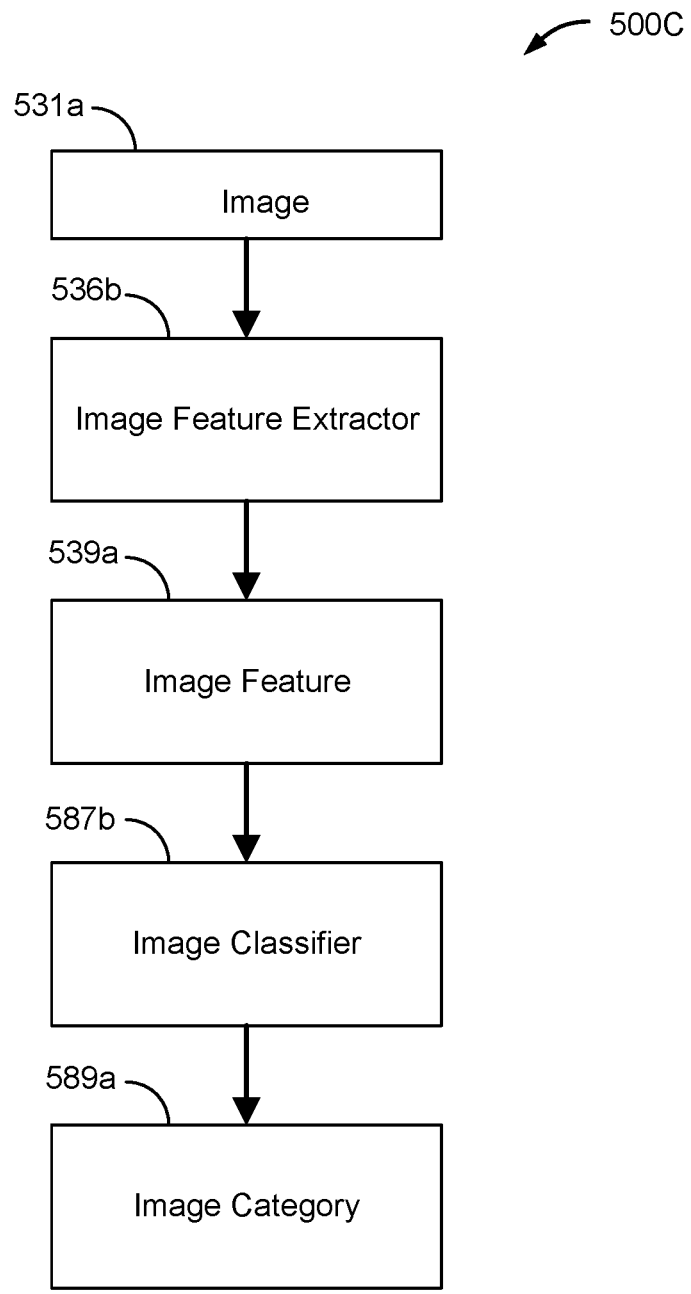

FIG. 5C shows an image classification sub-module 500C of the machine learning model 506 (FIG. 5A). The image classification sub-module 500C is trained to classify images into different image categories. Examples of image categories include person, table, car, tree, sky, building, among others. The image classification sub-module 500C includes the image feature extractor 536b, as well as an image classifier 587b. The image classifier 587b is not in the inference architecture of the trained machine learning model 506. For instance, as noted above, the machine learning model 506 is trained to perform a referring expressions task. The image classifier 587b is not in the inference architecture of the trained machine learning model 506 because the model 506 is not being trained to perform an image classification task. The image classifier 587b is included in the training architecture to improve extraction of image features by the image classification sub-module 500C, which is useful during the referring expressions task. The dataset used for training the image classification sub-module 500C includes training images (including image 531a) and ground truth outputs that include image category labels (e.g., for comparing with the image category 589a output). The dataset (including the training images and the image category labels) can be any suitable image classification dataset, such as ImageNet.

The sub-module determination engine 104 (FIG. 1) can obtain the dataset with the training images and the image category labels, and analyze the dataset to determine which sub-module to route the dataset (e.g., using a lookup table, by analyzing text of the dataset, or using any other suitable technique). Based on the analysis, the sub-module determination engine 104 can determine the dataset is an image classification dataset, and is to be used to train the image classification sub-module 500C. The training images can then be input to the image classification sub-module 500C. For example, the image feature extractor 536b can generate image features 539a from the training image 531a. As described above, the image features 539a can be a feature vector representing features of the image 531a. In one illustrative example, the image features 539a can be a 7×7×2048 dimension vector for the image 531a. The image features 539a can be output to the image classifier 587b, which can classify the image 531a into an image category 589a based on its image features 539a. The image classification can help train the image feature extractor 536b to generate more accurate image features 539a because larger datasets for image classification are available, and training on the larger datasets provides additional supervision (e.g., object labels) from which to extract image features. The loss determination engine 110 (FIG. 1) can compare the image category 589a to the category label for the image 531a to determine the loss associated with the output. The backpropagation engine 114 (FIG. 1) can tune the parameters (e.g., weights and/or biases) of the image classification sub-module 556b based on the loss. The loss determination engine 110 and the backpropagation engine 114 can be used to iteratively train the image classification sub-module 500C until the parameters are tuned to a point that the image feature extractor 536b can generate accurate image features.

Figure 5D:
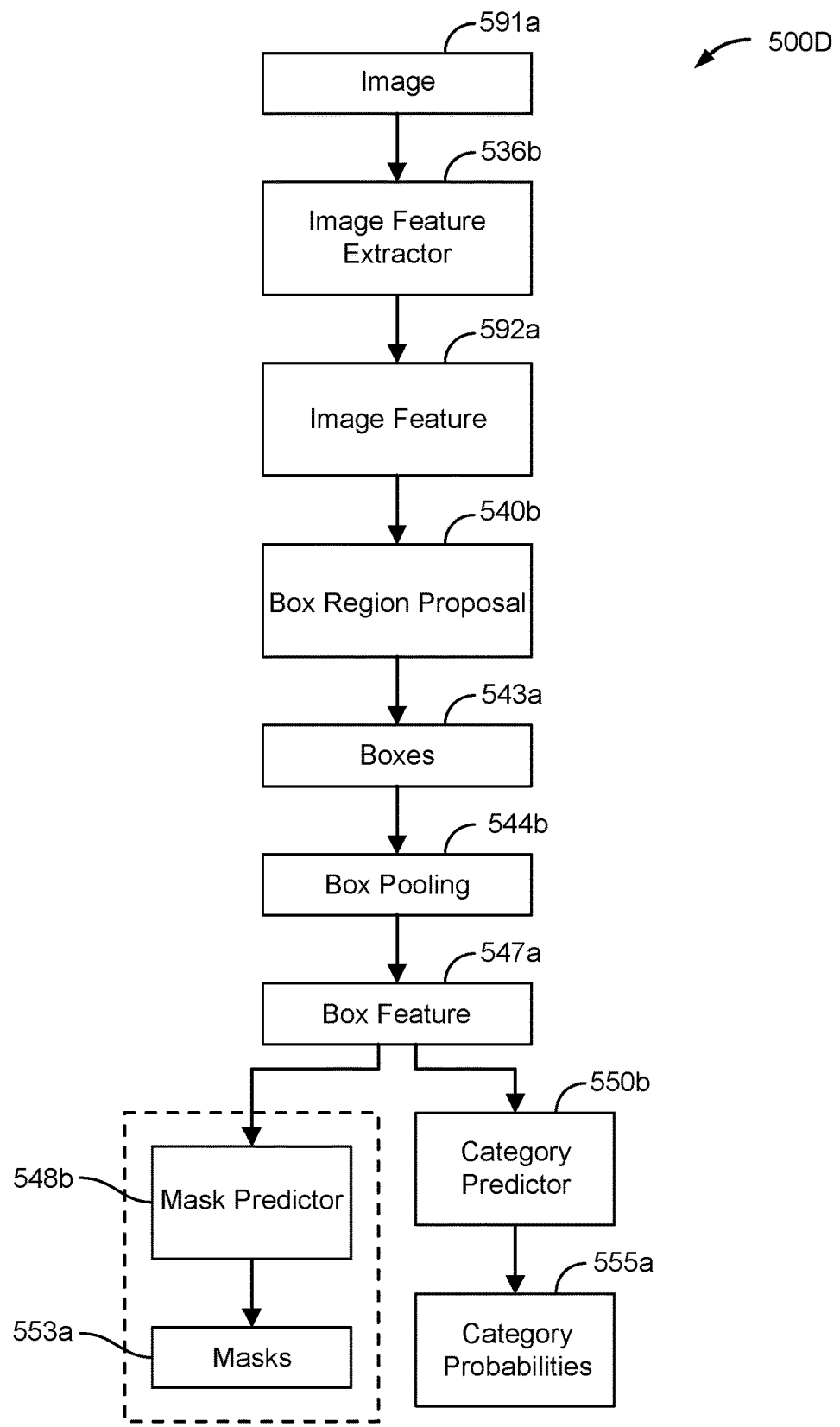

FIG. 5D shows an instance detection sub-module 500D of the machine learning model 506 (FIG. 5A). The instance detection sub-module 500D is trained to detect objects for bounding box proposals, to determine segmentation mask information within the bounding boxes, and to determine category probabilities for the objects in the bounding boxes. The instance detection sub-module 500D includes the image feature extractor 536b, the box region proposal 540b, the box pooling 544b, the category predictor 550b, and in some cases the mask predictor 548b. For example, the mask predictor 548b may only be used if the dataset being used to train the instance detection sub-module 500D has segmentation mask information. In some cases, the same neural network can be used for the box region proposal 540b, the box pooling 544b, and the mask predictor 548b. The neural network can include a CNN, such as a mask R-CNN. The dataset used for training the instance detection sub-module 500D includes training images (including image 591a) and ground truth outputs that include bounding box labels (e.g., for comparing with the bounding box 543a output), mask labels (e.g., for comparing with the masks 553a output), and category probability labels (e.g., for comparing with the category probabilities 555a output). The dataset (including the training images and the ground truth outputs) can be any suitable instance detection dataset, such as Open Images, COCO, among others.

The sub-module determination engine 104 (FIG. 1) can obtain the instance detection dataset, and can analyze the dataset to determine which sub-module to route the dataset. Based on the analysis, the sub-module determination engine 104 can determine the instance detection dataset is to be used to train the instance detection sub-module 500D. The training images can then be input to the instance detection sub-module 500D. For example, the image feature extractor 536b can generate image features 592a from the training image 591a. As noted, the image features 592a can be a feature vector representing features of the image 591a. In one illustrative example, the image features 592a can be a 7×7×2048 dimension vector for the image 591a. The image features 592a can be output to the box region proposal 540b, which can determine bounding boxes 543a based on the image features 592a. For example, based on the image features 592a, the box region proposal 540b can detect one or more objects in the image 591a and can identify where in the image 591a the one or more objects are located. The box region proposal 540b can output proposed bounding boxes 543a for the objects detected in the image 591a. As noted above with respect to the inference architecture, the bounding boxes 543a output can include y boxes per image and four parameters per box (e.g., the x-coordinate of the bounding box, the y-coordinate of the bounding box, the height of the bounding box, the width of the bounding box, the x-coordinate and the y-coordinate of each corner of the bounding box, or any other suitable identifying parameters). The loss determination engine 110 (FIG. 1) can compare the proposed bounding boxes 543a to the bounding box labels for the image 591a in order to determine a bounding box prediction loss associated with the output.

The bounding boxes 542a are output to box pooling 544b, which can determine the features within each of the bounding boxes 543a using the image features 592a. For example, the image features that are within the bounding boxes 543a can be determined or extracted from the image features 592a (e.g., from an image feature vector). The output from the box pooling 544b is the box features 547a, which include the image features within each of the bounding boxes 543a. The box features 547a are output to the mask predictor 548b and to the category predictor 550b.

The mask predictor 548b can generate a segmentation mask for the input image 591a, and can output segmentation masks 552a. The segmentation masks 553a can include portions of the segmentation mask that are within the bounding boxes 543a. In cases when the same neural network is used for the box region proposal 540b and the mask predictor 548b, the neural network can detect objects in the image 591a, and can generate a segmentation mask and bounding box proposals defining a predicted location in the image 591a for each object. The loss determination engine 110 (FIG. 1) can compare the proposed masks 553a to the mask labels for the image 591a in order to determine a mask prediction loss associated with the output.

The category predictor 550b determines or predicts a probability distribution for each bounding box of the bounding boxes 543a over the number of categories included in the instance detection dataset. The probability distribution indicates a likelihood (or probability) that the bounding box contains an object having a particular category. The category predictor 550b outputs the category probabilities 555a. In the category probabilities 555a, each bounding box has a predicted probability distribution over the number of categories in the dataset. The loss determination engine 110 (FIG. 1) can compare the proposed category probabilities 555a to the category probability labels for the image 591a in order to determine a category probability prediction loss associated with the output. The backpropagation engine 114 (FIG. 1) can then tune the parameters (e.g., weights and/or biases) of the instance detection sub-module 500D based on the loss associated with the bounding box prediction loss, the mask prediction loss, and the category probability loss. The loss determination engine 110 and the backpropagation engine 114 can be used to iteratively train the instance detection sub-module 500D until the parameters (e.g., weights and/or biases) are tuned so that the box region proposal 540b can accurately generate bounding box predictions, the mask predictor 548b can accurately generate mask predictions, and the category predictor 550b can accurately generate category probabilities.

Figure 5E:
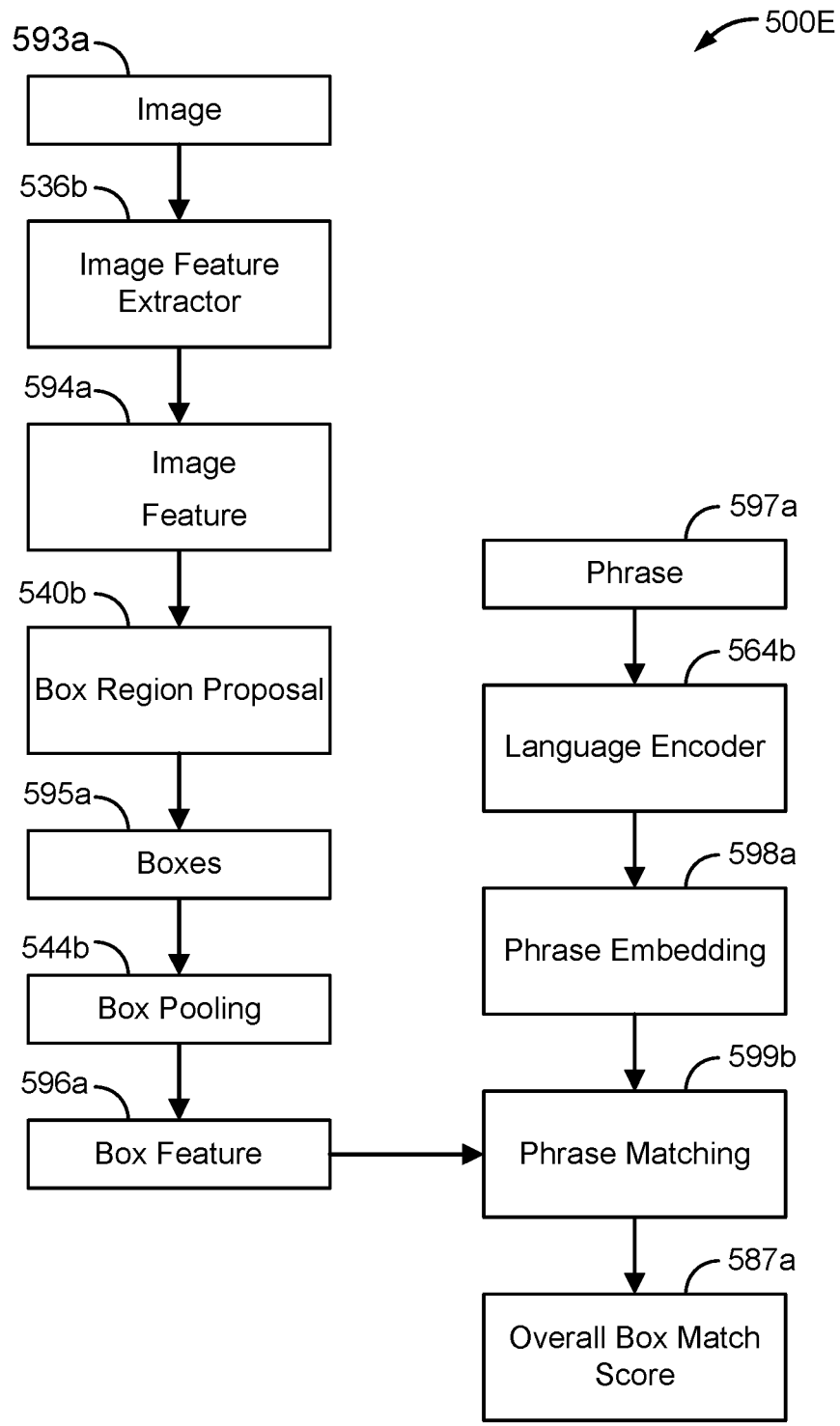

FIG. 5E shows a referring expression sub-module 500E of the machine learning model 506 (FIG. 5A). The referring expression sub-module 500E is trained to determine a region of an image that applies to an input phrase (a referring expression). The referring expression sub-module 500E includes the image feature extractor 536b, the box region proposal 540b, the box pooling 544b, the language encoder 564b, and a phrase matching 599b. In some cases, the phrase matching 599b can be the same as category matching 572b. As noted above, the same neural network can be used for the box region proposal 540b and the box pooling 544b. The dataset used for training the referring expression sub-module 500E includes training images (including image 593a), training phrases (including phrase 597a), and ground truth outputs that include overall box match prediction labels (e.g., for comparing with overall box prediction 587a output). The dataset (including the training images, the training phrases, and the ground truth outputs) can be any suitable referring dataset, such as ReferIt, Google RefExp, RefCOCO, Flickr30k Entities, among others.

The sub-module determination engine 104 (FIG. 1) can analyze the referring dataset to determine which sub-module to route the dataset. Based on the analysis, the sub-module determination engine 104 can determine the referring dataset is to be used to train the referring expression sub-module 500E. The training images can then be input to image feature extractor 536b of the referring expression sub-module 500E. For example, the image feature extractor 536b can generate image features 594a (e.g., a feature vector) from the training image 593a, which are output to the box region proposal 540b. Based on the image features 592a, the box region proposal 540b can detect one or more objects in the image 593a and can determine bounding boxes 595a for the one or more objects. The bounding boxes 595a are output to box pooling 544b, which can determine the features within each of the bounding boxes 543a using the image features 592a, as described above. The box features 547a are output to the phrase matching 599b.

The training phrases are input to the language encoder 564b. For example, the language encoder 564b can perform sentence classification to interpret what is being said in the phrase 597a. As noted above, the language encoder 564b can include a neural network, such as a bi-directional Long Short-Term Memory (LSTM) recurrent neural network (RNN). The language encoder 564b can also perform phrase embedding to output a vector representation of the phrase. The language encoder 564b can output a phrase embedding 598a, which can include the vector representation of the phrase.

The phrase embedding 598a is output to the phrase matching 599b (or to the category matching 572b in some cases). The phrase matching 599b can match the phrase embedding 598a with the box features 596a to determine an overall box prediction 587a. In one illustrative example, the phrase matching 599b can determine a distance (e.g., such as an L2 distance, relating to the Euclidean distance or norm, a cosine distance, or other suitable distance) between the box features of each bounding box and the phrase embedding 598a. For example, the cosine distance (or other distance) between the feature vector of each bounding box and the vector representation of the phrase embedding 598a can be determined, and can be used to determine the overall box prediction 587a (e.g., as the cosine similarity). The loss determination engine 110 (FIG. 1) can compare the overall box prediction 587a to the overall box prediction label for the image 593a and phrase 597a combination, in order to determine the loss associated with the output. The backpropagation engine 114 (FIG. 1) can then be used to tune the parameters (e.g., weights and/or biases) of the referring expression sub-module 500E based on the loss. The loss determination engine 110 and the backpropagation engine 114 can be used to iteratively train the referring expression sub-module 500E until the parameters are tuned so that the referring expression sub-module 500E can accurately make bounding box predictions from images based on different types of input phrases.

Figure 5F:
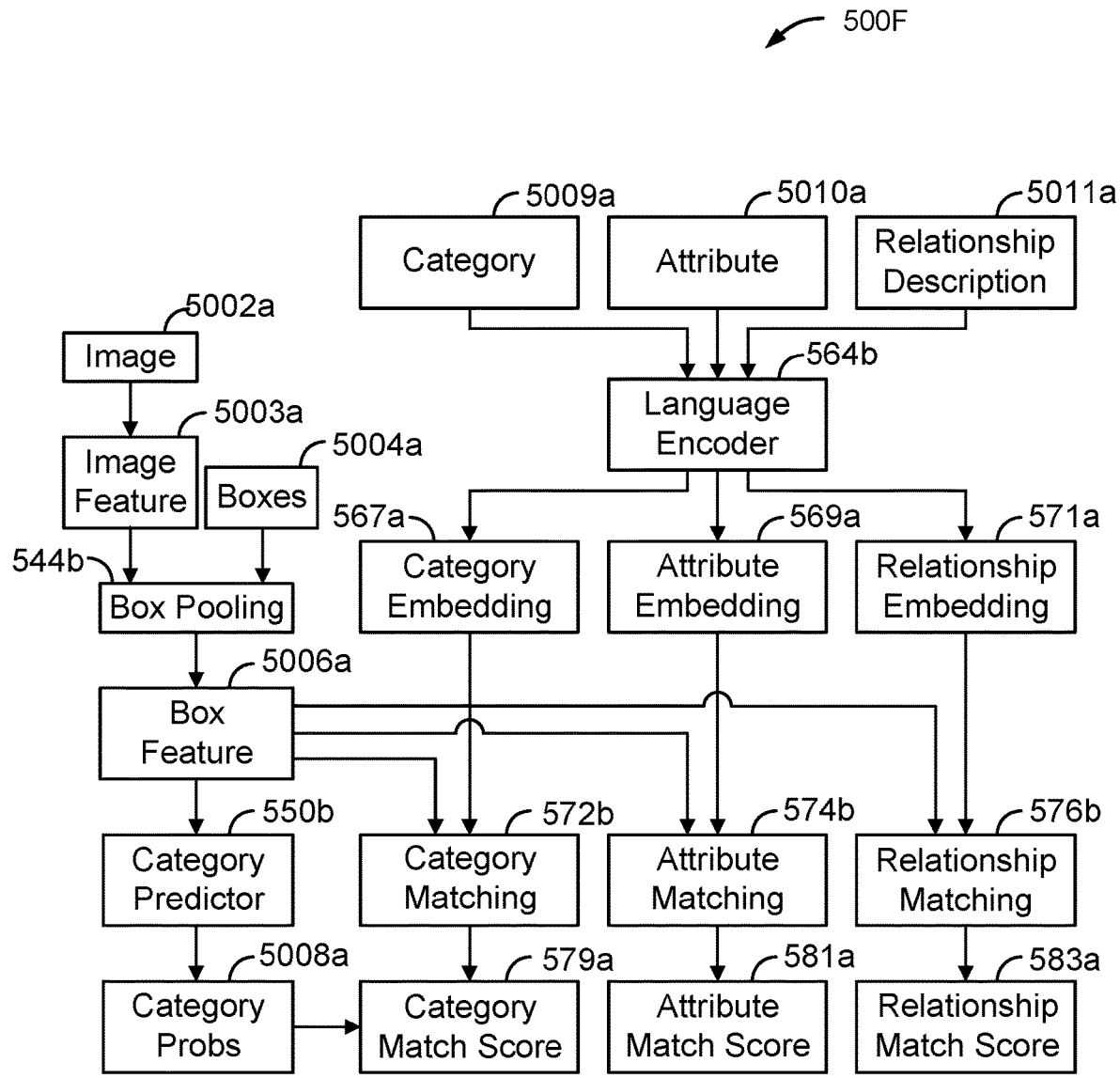

FIG. 5F shows a category, attribute, and relationship sub-module 500F of the machine learning model 506 (FIG. 5A). The category, attribute, and relationship sub-module 500F is trained to determine a category match score, an attribute match score, and a relationship match score based on an input image, input bounding boxes, an input category, an input attribute, and an input relationship description. The category, attribute, and relationship sub-module 500F includes the box pooling 544b, the category predictor 550b, the language encoder 564b, the category matching 572b, the attribute matching 574b, and the relationship matching 576b. The dataset used for training the category, attribute, and relationship sub-module 500F includes training images (including training image 5002a), training bounding boxes (including one or more training bounding boxes 5004a), training categories (including training category 5009a), training attributes (including training attribute 5010a), and training relationship descriptions (including training relationship description 5011a). The dataset also includes ground truth outputs, including category match score labels (e.g., for comparing with category match score 579a output), attribute match score labels (e.g., for comparing with attribute match score 581a output), and relationship match score labels (e.g., for comparing with relationship match score 583a output). The dataset (including the training images, the training categories, attributes, and relationship descriptions, and the ground truth outputs) can be any suitable dataset, such as the Visual Genome dataset, among others. In cases in which the Visual Genome dataset is used to train the category, attribute, and relationship sub-module 500F, the image feature extractor 536b and the box region proposal 540b may not be trained, because the bounding boxes in the Visual Genome dataset can be noisy. In some cases, the image feature extractor 536b and the box region proposal 540b can also be included in the category, attribute, and relationship sub-module 500F.

The sub-module determination engine 104 (FIG. 1) can analyze the dataset to determine which sub-module to route the dataset. Based on the analysis, the sub-module determination engine 104 can determine the dataset is to be used to train the category, attribute, and relationship sub-module 500F. The image features extracted from the training images and the training bounding boxes can then be input to the box pooling 544b. For example, the box pooling 544b can determine the image features 5003a from the images 5002a that are within each of the bounding boxes 5004a. The output from the box pooling 544b is the box features 5006a, which include the image features within each of the bounding boxes 5004a. The box features 5006a are output to the category predictor 550b, the category matching 572b, the attribute matching 574b, and the relationship matching 576b. The category predictor 550b determines or predicts a probability distribution for each bounding box of the bounding boxes 5004a over the number of categories included in the dataset, as described above. The category predictor 550b outputs the category probabilities 5008a, which includes a predicted probability distribution for each bounding box over the number of categories in the dataset.

The training category 5009a, the training attribute 5010a, and the training relationship description 5011a are input to the language encoder 564b. As previously described, the language encoder 564b can determine a class for the category 5009a, for the attribute 5010a, and for the relationship description 5011a. The language encoder 564b can perform embedding to output vector representations of the category 5009a, attribute 5010a, and relationship description 5011a. As noted above, the language encoder 564b can include a neural network, such as a bi-directional Long Short-Term Memory (LSTM) recurrent neural network (RNN), which can be combined with FastText or other embedding technique. Based on the embedding, the language encoder 564b can output a category embedding 567a, an attribute embedding 569a, and a relationship embedding 571a. In some cases, the category embedding 567a, the attribute embedding 569a, and the relationship embedding 571a can be vector representations of the determined classes.

The category embedding 567a is output to the category matching 572b. As noted above, the box features 5006a can also be output to the category matching 572b. The category matching 572b can match the category embedding 567a with the box features 5006a to determine a category match score 579a. The category match score 579a can include a match score (e.g., a scalar) for each bounding box in the bounding boxes 5004a. The category match score 579a can indicate a likelihood that a given bounding box includes one or more objects having the category 5009a. In one illustrative example, the category matching 572b can determine a distance (e.g., such as an L2 distance, relating to the Euclidean distance or norm) between the box features of each bounding box and the category embedding 567a (e.g., the L2 distance between the feature vector of each bounding box and the vector representation of the category embedding 567a). The L2 distance for each bounding box can be used as the category match score 579a for each bounding box. In another illustrative example, the category matching 572b can look up the category probability from the category probabilities 5008a with the nearest category embedding.

The attribute embedding 569a is output to the attribute matching 574b. As noted above, the box features 5006a can also be output to the category matching 572b. The attribute matching 574b can match the attribute embedding 569a with the box features 5006a to determine an attribute match score 580a. The attribute match score 580a can include an attribute match score for each bounding box in the bounding boxes 5004a (e.g., a scaler for each bounding box). The attribute match score 581a can indicate a likelihood that a given bounding box includes one or more objects having the attribute 5010a. In one illustrative example, the attribute matching 574b can determine a distance (e.g., such as an L2 distance) between the box features of each bounding box and the attribute embedding 568a (e.g., the L2 distance between the feature vector of each bounding box and the vector representation of the attribute embedding 569a). The L2 distance can be used as the attribute match score 581a for each bounding box.

The relationship embedding 571a is output to the relationship matching 576b. As noted above, the box features 5006a can also be output to the category matching 572b. The relationship matching 576b can match the relationship embedding 571a with the box features 5006a to determine a relationship match score 583a. The relationship match score 583a can include a relationship match score for each bounding box in the bounding boxes 5004a (e.g., a scaler for each bounding box). The relationship match score 583a can indicate a likelihood that a given bounding box includes one or more objects having the relationship description 5011a. In one illustrative example, the relationship matching 576b can determine a distance (e.g., such as an L2 distance) between the box features of each bounding box and the relationship embedding 571a (e.g., the L2 distance between the feature vector of each bounding box and the vector representation of the relationship embedding 570a). The L2 distance can be used as the relationship match score 583a for each bounding box.

The loss determination engine 110 (FIG. 1) can compare the proposed category match score 579a, the proposed attribute match score 581a, and the proposed relationship match score 583a to the category match score labels, the attribute match score labels, and the relationship match score labels for the image 5002a, category 5009a, attribute 5010a, and relationship description 5011a combination in order to determine a prediction loss associated with the outputs. The backpropagation engine 114 (FIG. 1) can then tune the parameters (e.g., weights and/or biases) of the instance detection sub-module 500D based on the loss associated with the bounding box prediction loss, the mask prediction loss, and the category probability loss. The loss determination engine 110 and the backpropagation engine 114 can be used to iteratively train the category, attribute, and relationship sub-module 500F until the parameters (e.g., weights and/or biases) are tuned so that the category, attribute, and relationship sub-module 500F can accurately generate category match scores, attribute match scores, and relationship match scores.

Figure 5G:
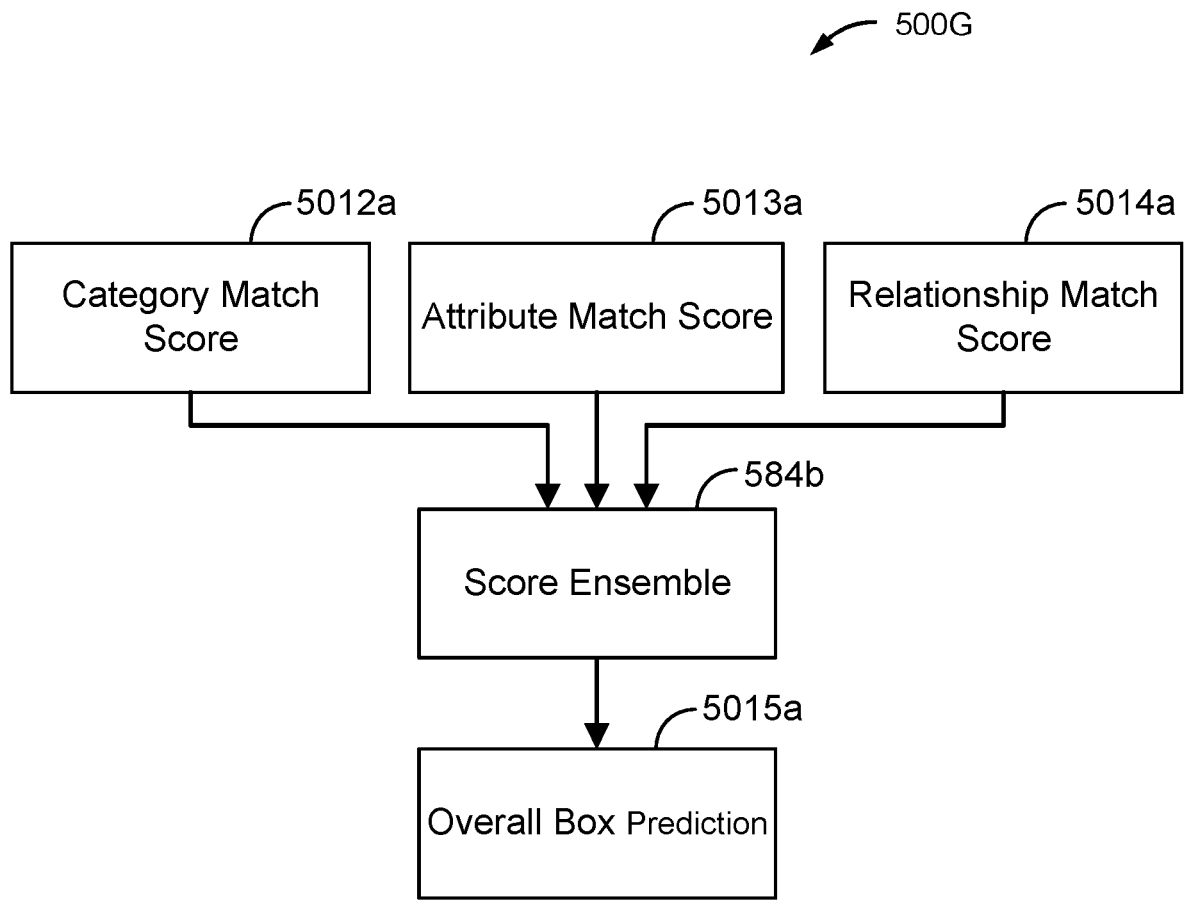

FIG. 5G shows a score ensemble sub-module 500G of the machine learning model 506 (FIG. 5A). The score ensemble sub-module 500G is trained to determine an overall box prediction. The dataset used for training the score ensemble sub-module 500G includes training category match scores (including training category match score 5012a), training attribute match scores (including training attribute match score 5013a), and training relationship match scores (including training relationship match score 5014a). The dataset also includes ground truth outputs, including overall box prediction labels (e.g., for comparing with overall box prediction 5015a output). The dataset (including the training data and the ground truth outputs) can be any suitable dataset, such as the Visual Genome dataset, among others. The score ensemble sub-module 500G can be trained after the category, attribute, and relationship sub-module 500F is trained and the weights are fixed. For example, in some cases, the previously trained relationship sub-module 500F (from FIG. 5F) can provide the category match score 5012a, the attribute match score 5013a, and the relationship match score 5014a to the score ensemble sub-module 500G. In some cases, the category match score 5012a, the attribute match score 5013a, and the relationship match score 5014a can be part of a training dataset.

The sub-module determination engine 104 (FIG. 1) can analyze the dataset to determine which sub-module to route the dataset. Based on the analysis, the sub-module determination engine 104 can determine the dataset is to be used to train the score ensemble sub-module 500G. The training data can be input to the score ensemble 584b. For example, the category match score 5012a, the attribute match score 5013a, and the relationship match score 5014a are input to the score ensemble 584b. As noted above, the score ensemble 584b can take the three scores for each bounding box, and can output a single match score for each bounding box. In one illustrative example, the score ensemble 584b can be multilayer perceptron (MLP). The MLP can receive as input the category match score 5012a, the attribute match score 5013a, and the relationship match score 5014a for a bounding box, and can output a single score for the bounding box.

The score ensemble 584b can choose the bounding boxes having match scores greater than a match score threshold, and can output the overall box prediction 5015a. The overall box prediction 5015a includes the final box predictions from the detected bounding boxes that have match scores over the match score threshold. The overall box prediction 5015a can include one or more bounding boxes.

Once all of the sub-modules are selectively trained based on the various datasets, the result is the machine learning model 506, which can be used at inference to perform a referring expressions task. It is noted that various layers are shared amongst the sub-modules of the machine learning model 506. For example, the image feature extractor 536b is shared among the sub-module 500C, the sub-module 500D, and the sub-module 500E. The language encoder 564b is shared among the sub-module 500E and the sub-module 500F.

Once the machine learning model 506 (FIG. 5A) is trained to perform the referring expressions task, the machine learning model 506 can be used to perform any suitable function based on a result of the referring expressions task. For example, a region identified based on a referring expression can be used to perform one or more functions related to the identified region. Examples of functions that can be performed using a result of a referring expressions task include an automatic image editing function and a human-robot interaction, which are illustrated in the diagrams of FIG. 7 and FIG. 8.

An automatic image editing function can be performed based on a region identified using a referring expressions task. FIG. 7 is a diagram illustrating an example of an automatic image editing function. The input image 702 includes a first person 706, a part of a second person 708, and a part of a third person 710. Based on the referring expression "Remove guy in background and legs just behind me" spoken by the first person 704, the trained machine learning model 506 (FIG. 5A) can perform the referring expressions task to identify the regions of the image that include the part of the second person 708 and the part of the third person 710. For example, a segmentation mask and/or bounding box can be provided to identify the regions of the image 702 corresponding to the part of the second person 708 and the part of the third person 710. As shown, the part of the second person 708 and the part of the third person 710 are removed from the output image 704, leaving only the first person 706 in the output image 704.

Another example of a function that can be performed based on a region identified using a referring expressions task is a human-robot interaction. FIG. 8 is a diagram illustrating an example of a human-robot interaction function. The input image 802 includes several objects, including a first water bottle 806, a second water bottle 808, and a third water bottle 810. Based on the referring expression "Pick up the second water bottle from the left", the trained machine learning model 506 (FIG. 5A) can perform the referring expressions task to identify the region of the image that includes the water bottle 808, which is the second water bottle from the left. For example, the output image 804 with the bounding box 812 can be provided to a robot to identify the region of the image 802 corresponding to the water bottle 808. An instruction can then be sent to a robot to grab (or pick up) the water bottle 808 identified by the bounding box 812.

Other example functions that can be performed based on a region identified using a referring expressions task include visual question and answering or dialog (e.g., based on a particular referring expression asking a question about an object or characteristic of an object, identification of the object or the characteristic of the object in the region can be provided) and an image search (e.g., based on a particular referring expression from a user asking about an object in an image, an image including the object, or a region of the image that includes the object, can be retrieved and displayed for the user).

Figure 9:
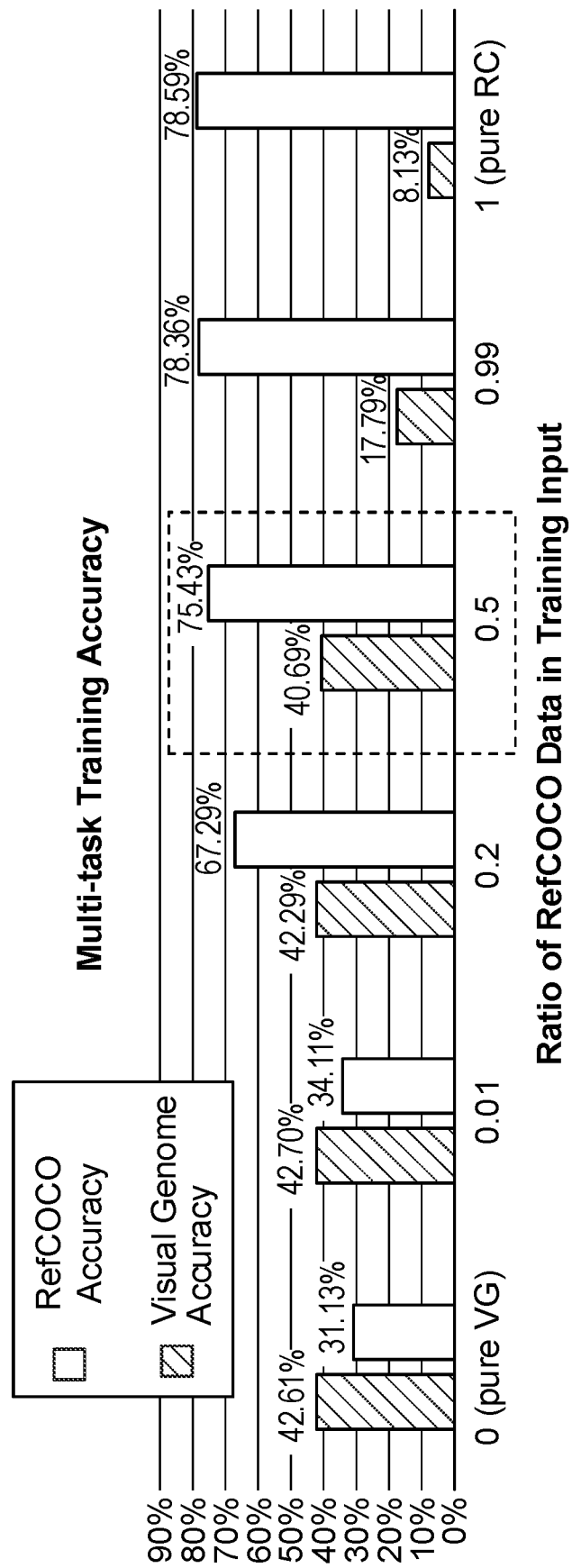
FIG. 9 is a graph illustrating accuracy of the multi-task training on two datasets, in accordance with some examples provided herein.

FIG. 9 is a graph 900 illustrating the accuracy of the multi-task training of a referring expressions machine learning model using two datasets, including the RefCOCO dataset and the Visual Genome dataset. The percentages of data from each dataset are represented by the x-axis, and the accuracy percentage is represented by the y-axis. Experiments of training a referring model (referred to as MattNet) using a combination of RefCOCO and Visual Genome datasets was performed. Referring phrases were generated for the Visual Genome dataset, so that the two dataset can share the same neural network architecture. In each training batch, images were randomly sampled from RefCOCO and Visual Genome with a sampling probability (ratio of data from RefCOCO) as a hyper parameter. With each sampled image, all the bounding boxes in that image were used as training cases. The graph in FIG. 9 shows that, with mult-task training, a single machine learning model can be generated that performs well on both datasets.

An example of a process performed using the techniques described herein will now be described. FIG. 10 is a flowchart illustrating an example of a process 1000 for training a machine learning model. At block 1002, the process 1000 includes generating the machine learning model Similar to the machine learning models 106, 406, and 506, the machine learning model is configured to perform one or more tasks based on different datasets. The machine learning model includes a first sub-module configured to perform a first task and a second sub-module configured to perform a second task. In some implementations, the machine learning model is a neural network model or a combination of multiple neural network models. In some examples, the first sub-module can include a first set of one or more neural network layers, and the second sub-module can include a second set of one or more neural network layers that is different than the first set of one or more neural network layers.

At block 1004, the process includes obtaining a first training dataset having a first format. At block 1006, the process 1000 includes obtaining a second training dataset having a second format. The second format is different than the first format. While two training datasets (the first and second training datasets) are used as an example, one of ordinary skill will appreciate that any number of training datasets can be provided as input for training the machine learning model.

At block 1008, the process 1000 includes training the first sub-module to perform the first task using the first training dataset. The first sub-module can be selected for training using the first training dataset based on the first format. For example, the process 1000 can include selecting the first sub-module for being trained by the first training dataset based on the first format of the first training dataset. The first format of the first training dataset can include a name of the first training dataset, a task for which the first training dataset is applicable, content of the first training dataset (e.g., images, phases, labels, and/or other content), any combination thereof, and/or other suitable information. For example, the process 1000 can determine the name, task, and/or content of the first training dataset, and can select the first sub-module for being trained by the first training dataset based on the name, task, and/or content of the first training dataset.

At block 1010, the process 1000 includes training the second sub-module to perform the second task. The second sub-module is trained using the second training dataset. The second sub-module can be selected for training using the second training dataset based on the second format. For example, the process 1000 can include selecting the second sub-module for being trained by the second training dataset based on the second format of the second training dataset. The second format of the second training dataset can include a name of the second training dataset, a task for which the second training dataset is applicable, content of the second training dataset (e.g., images, phases, labels, and/or other content), any combination thereof, and/or other suitable information. For example, the process 1000 can determine the name, task, and/or content of the second training dataset, and can select the second sub-module for being trained by the second training dataset based on the name, task, and/or content of the second training dataset.

In one illustrative example, the first task is image segmentation, and the second task is object detection. In another illustrative example, the first task is phrase parsing, and the second task is image classification. As noted above, more than two datasets can be input to the machine learning model. In some cases, the machine learning model can include more than two sub-modules. For instance, in one example, the machine learning model can be the machine learning model 506 (FIG. 5A), and can include the sub-modules shown in FIG. 5B through FIG. 5G.

In some examples, the process 1000 includes obtaining an output from the first sub-module based on the training of the first sub-module using the first training dataset. In such examples, the process 1000 includes selecting an additional dataset for training the first sub-module based on the obtained output. For example, the process 1000 can determine that the additional dataset is needed to further train the first sub-module based on the obtained output, which can further enhance the accuracy of the first sub-module in performing the task associated with the first sub-module.

In some examples, a combination of a portion of the first training dataset and a portion of the second training dataset is processed by the machine learning model. For instance, a percentage of data from the first training dataset and a percentage of data from the second training dataset can be included in the combination of data that is processed by the machine learning model in one or more iterations. In some cases, the percentage of data from the first training dataset and the percentage of data from the second training dataset that are included in the combination of data are configurable using one or more parameters that can be input to the machine learning model. For instance, as described above, a hyper-parameter input to the machine learning model can be used to determine the percentage of data from the different datasets. In some cases, the hyper-parameter can be tuned and can be varied for different problems, as described above.

In some examples, the machine learning model includes at least one shared layer included in the first sub-module and the second sub-module, and at least one non-shared layer included in the first sub-module and not included in the second sub-module. In some cases, the at least one shared layer is trained using the first training dataset and the second training dataset, and the at least one non-shared layer is trained using the first training dataset (e.g., the first dataset and not the second dataset). In some examples, the process 1000 includes obtaining a third dataset, and training the first sub-module and the second sub-module using the third training dataset to perform at least a third task. For instance, using the examples from above, the category, attribute, and relationship sub-module 500F and the score ensemble sub-module 500G can both be trained using the Visual Genome dataset. In some examples, the process 1000 includes obtaining a third dataset, and training the first sub-module using the first training dataset and the third training dataset to perform at least the first task. For instance, using the examples from above, the image feature extractor 536b included in the image classification sub-module 500C, the instance detection sub-module 500D, and the referring expression sub-module 500E can be trained using multiple datasets.

In some examples, once trained, the machine learning model can provide an output associated with a third task. The third task can be different than the first task and the second task, or can be the same as the first task or the second task. In one illustrative example, the first task can be a phrase parsing task, the second task can be an image classification task, and the third task can be a referring expressions task, a visual question and answer task, an object instance segmentation task, or other task.

Figure 11:
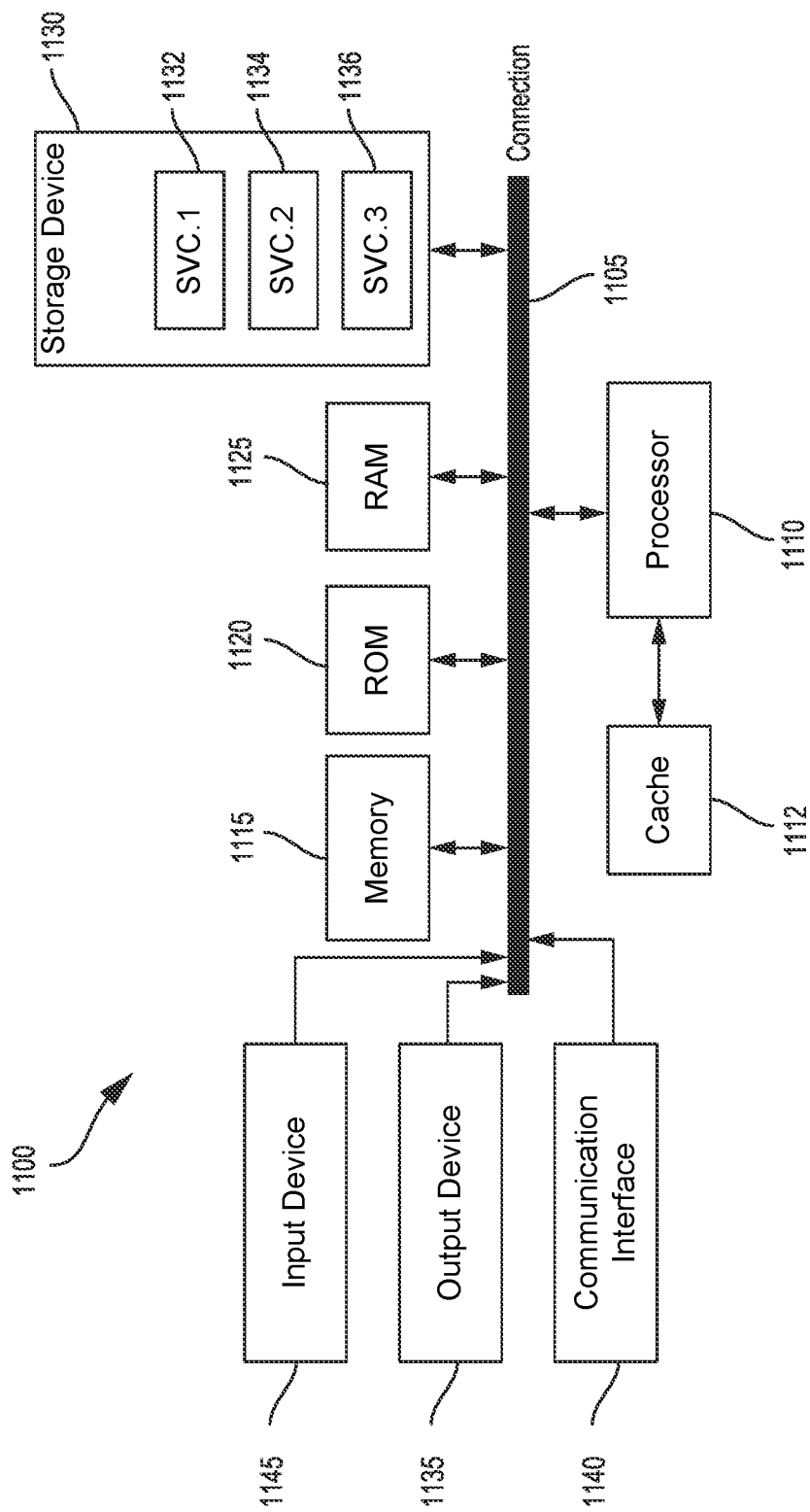
FIG. 11 is an example computing device architecture of an example computing device that can implement the various techniques described herein.

In some examples, the process 1000 may be performed by a computing device or apparatus, such as a computing device having the computing device architecture 1100 shown in FIG. 11. In one example, the process 1000 can be performed by a computing device with the computing device architecture 1100 implementing the machine learning system 100. In another example, the process 1000 can be performed by a computing device with the computing device architecture 1100 implementing the machine learning system 600. In one example, the process 1000 can be performed by a computing device with the computing device architecture 1100 implementing the machine learning model 506 with the various sub-modules shown in FIG. 5B through FIG. 5G. In some cases, the computing device or apparatus may include an input device, a sub-module determination engine, an output device, a processor, microprocessor, microcomputer, or other component that is configured to carry out the steps of process 1000. The computing device may further include a display, a network interface configured to communicate and/or receive the data, any combination thereof, and/or other component(s). The network interface may be configured to communicate and/or receive Internet Protocol (IP) based data or other type of data.

Process 1000 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 11 illustrates an example computing device architecture 1100 of an example computing device which can implement the various techniques described herein. For example, the computing device architecture 1100 can implement the machine learning system 100 shown in FIG. 1. In another example, the computing device architecture 1100 can implement the machine learning system 600 shown in FIG. 6. In another example, the computing device architecture 1100 can implement the machine learning model 506 shown in FIG. 5A. The components of computing device architecture 1100 are shown in electrical communication with each other using connection 1105, such as a bus. The example computing device architecture 1100 includes a processing unit (CPU or processor) 1110 and computing device connection 1105 that couples various computing device components including computing device memory 1115, such as read only memory (ROM) 1120 and random access memory (RAM) 1125, to processor 1110.

Computing device architecture 1100 can include a cache of high-speed memory connected directly with, in close proximity to, or integrated as part of processor 1110. Computing device architecture 1100 can copy data from memory 1115 and/or the storage device 1130 to cache 1112 for quick access by processor 1110. In this way, the cache can provide a performance boost that avoids processor 1110 delays while waiting for data. These and other modules can control or be configured to control processor 1110 to perform various actions. Other computing device memory 1115 may be available for use as well. Memory 1115 can include multiple different types of memory with different performance characteristics. Processor 1110 can include any general purpose processor and a hardware or software service, such as service 1 1132, service 2 1134, and service 3 1136 stored in storage device 1130, configured to control processor 1110 as well as a special-purpose processor where software instructions are incorporated into the processor design. Processor 1110 may be a self-contained system, containing multiple cores or processors, a bus, memory controller, cache, etc. A multi-core processor may be symmetric or asymmetric.

To enable user interaction with the computing device architecture 1100, input device 1145 can represent any number of input mechanisms, such as a microphone for speech, a touch-sensitive screen for gesture or graphical input, keyboard, mouse, motion input, speech and so forth. Output device 1135 can also be one or more of a number of output mechanisms known to those of skill in the art, such as a display, projector, television, speaker device, etc. In some instances, multimodal computing devices can enable a user to provide multiple types of input to communicate with computing device architecture 1100. Communications interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. Storage device 1130 can include services 1132, 1134, 1136 for controlling processor 1110. Other hardware or software modules are contemplated. Storage device 1130 can be connected to the computing device connection 1105. In one aspect, a hardware module that performs a particular function can include the software component stored in a computer-readable medium in connection with the necessary hardware components, such as processor 1110, connection 1105, output device 1135, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of training a machine learning model, comprising:
    generating a neural network model to perform a referring expression task based on a plurality of training datasets, wherein each training dataset includes data of a different data format, wherein the neural network model includes an image classification sub-module configured to perform an image classification task and a phrase parsing sub-module configured to perform a phrase parsing task, wherein the image classification task and phrase parsing task are combined to obtain the referring expression task of the neural network model;
    receiving the plurality of training datasets, wherein the plurality of training datasets comprises a first training dataset comprising images and a second training dataset comprising natural language phrases, wherein the first training dataset is an image classification dataset, and wherein the second training dataset is a natural language dataset;
    determining a data format associated with the first training dataset is an image format;
    identifying, using a lookup table, the image classification sub-module as being associated with the image format;
    training the image classification sub-module using the images of the image classification dataset, wherein the image classification sub-module is trained to perform the image classification task;
    determining a data format associated with the second training dataset is a text format identifying, using the lookup table, the phrase parsing sub-module as being associated with the text format; and
    training the phrase parsing sub-module using the natural language phrases of the natural language dataset, wherein the phrase parsing sub-module is trained to perform the phrase parsing task.

2. The method of claim 1, further comprising:
    obtaining an output from the image classification sub-module based on the training of the image classification sub-module using the image classification dataset; and
    selecting an additional dataset for training the image classification sub-module based on the obtained output.

3. The method of claim 1, wherein a combination of a portion of the image classification dataset and a portion of the natural language dataset is processed by the neural network model.

4. The method of claim 3, wherein a percentage of data from the image classification dataset and a percentage of data from the natural language dataset included in the combination are configurable using one or more parameters input to the neural network model.

5. The method of claim 1, wherein the neural network model includes at least one shared layer included in the image classification sub-module and the phrase parsing sub-module, and includes at least one non-shared layer included in the image classification sub-module and not included in the phrase parsing sub-module.

6. The method of claim 5, wherein the at least one shared layer is trained using the image classification dataset and the natural language dataset, and wherein the at least one non-shared layer is trained using the image classification dataset.

7. The method of claim 1, further comprising:
    obtaining a training dataset; and
    training, using the training dataset, the image classification sub-module and the phrase parsing sub-module to perform at least another task.

8. The method of claim 1, further comprising:
    obtaining a training dataset; and
    training, using the image classification dataset and the training dataset, the image classification sub-module to perform at least the image classification task.

9. A machine learning system, comprising:
    an input device configured to receive a plurality of training datasets comprising an image classification dataset and a natural language dataset;
    a neural network model for performing a referring expression task, including an image processing sub-module with a first plurality of neural network layers for performing an object detection task and a natural language sub-module with a second plurality of neural network layers for performing a phrase parsing task, wherein the object detection task and phrase parsing task are combined to obtain the referring expression task of the neural network model;
    a sub-module determination engine configured to:
        receive the plurality of training datasets, wherein the plurality of training datasets comprises a first training dataset comprising images and a second training dataset comprising natural language phrases;
        determine a data format associated with the first training dataset is an object detection task;
        determine a data format associated with the second training dataset is a phrase parsing task;
        identifying, using a lookup table, the image processing sub-module as being associated with the object detection task;

identifying, using the lookup table, the natural language sub-module as being associated with the phrase parsing task;

training the first plurality of neural network layers of the image processing sub-module using the image classification dataset, wherein the image processing sub-module is trained to perform the object detection task; and training the second plurality of neural network layers of the natural language sub-module using the natural language dataset, wherein the natural language sub-module is trained to perform the phrase parsing task; and an output device configured to output the referring expression task of the neural network model based on the image processing sub-module or the natural language sub-module.

10. The machine learning system of claim 9, wherein the output device is configured to obtain an output from the image processing sub-module based on the training of the image processing sub-module using the image classification dataset, and wherein the input device is configured to select an additional dataset for training the image processing sub-module based on the obtained output.

11. The machine learning system of claim 9, wherein the input device is configured to receive one or more parameters, and wherein the neural network model is configured to use the one or more parameters to determine a percentage of data from the image classification dataset and a percentage of data from the natural language dataset to use for training the image processing sub-module and the natural language sub-module.

12. The machine learning system of claim 9, wherein the image processing sub-module and the natural language sub-module include at least one shared neural network layer included in both the image processing sub-module and the natural language sub-module, and wherein the image processing sub-module includes at least one non-shared neural network layer included in the image processing sub-module and not included in the natural language sub-module.

13. The machine learning system of claim 12, wherein the at least one shared neural network layer is trained using the image classification dataset and the natural language dataset, and wherein the at least one non-shared neural network layer is trained using the image classification dataset and not the natural language dataset.

14. The machine learning system of claim 9, wherein the input device is configured to obtain a training dataset, and wherein the first plurality of neural network layers of the image processing sub-module and the second plurality of neural network layers of the natural language sub-module are trained using the training dataset to perform at least another task.

15. The method of claim 1, wherein training, using the image classification dataset, the image classification sub-module of the neural network model and training, using the natural language dataset, the phrase parsing sub-module of the neural network model, occurs in the neural network model concurrently.

16. The method of claim 1, wherein that data format comprises at least one of a name of a dataset of the plurality of training datasets or a task for which a dataset of the plurality of training datasets is applicable.

17. The system of claim 9, wherein that data format comprises at least one of a name of a dataset of the plurality of training datasets or, a content type of a dataset of the plurality of training datasets.

* * * * *